United States Patent
Zhang et al.

(10) Patent No.: US 10,531,439 B2
(45) Date of Patent: Jan. 7, 2020

(54) COMMUNICATION METHOD AND COMMUNICATIONS DEVICE

(71) Applicant: Huawei Technologies Co., Ltd., Shenzhen (CN)

(72) Inventors: Hongping Zhang, Shanghai (CN); Wenji Liu, Shenzhen (CN); Wei Quan, Beijing (CN); Xiaodong Yang, Shenzhen (CN); Qinghai Zeng, Shanghai (CN); Yi Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 15/798,965

(22) Filed: Oct. 31, 2017

(65) Prior Publication Data

US 2018/0054814 A1    Feb. 22, 2018

Related U.S. Application Data

(63) Continuation of application No. PCT/CN2015/079034, filed on May 15, 2015.

(51) Int. Cl.
*H04W 72/04* (2009.01)
*H04W 76/27* (2018.01)
(Continued)

(52) U.S. Cl.
CPC ......... *H04W 72/0406* (2013.01); *H04L 5/001* (2013.01); *H04L 5/0053* (2013.01);
(Continued)

(58) Field of Classification Search
CPC .................. H04W 72/0406; H04W 76/27
See application file for complete search history.

(56) References Cited

U.S. PATENT DOCUMENTS

2009/0109950 A1    4/2009 Richardson et al.
2013/0196604 A1    8/2013 Jung et al.
(Continued)

FOREIGN PATENT DOCUMENTS

CN    101843055 A    9/2010
CN    102083131 A    6/2011
(Continued)

OTHER PUBLICATIONS

"Activation and deactivation for dual connectivity",3GPP TSG RAN WG2 #85b R2-141487, Valencia, Spain, 3rd Generation Partnership Project Valbonne, France (Mar. 31-Apr. 4, 2014).
"Discussion on CA beyond 5CCs," 3GPP TSG-RAN WG2 #89, Athens, Greece, R2-150113, 3rd Generation Partnership Project, Valbonne, France (Feb. 9-13, 2015).
CN 201580063176.4, Office Action, dated Apr. 18, 2019.

*Primary Examiner* — Zhensheng Zhang
(74) *Attorney, Agent, or Firm* — Leydig, Voit & Mayer, Ltd.

(57) ABSTRACT

Embodiments of the present disclosure provide a communication method and a communications device. The method includes: generating, by a first communications device, a MAC PDU data packet, where the MAC PDU data packet includes at least one first-type MAC CE, each first-type MAC CE is used to carry information about multiple secondary serving cells, and the first communications device determines a location of the first-type MAC CE in the MAC PDU data packet according to a secondary serving cell corresponding to the first-type MAC CE; and sending, by the first communications device, the MAC PDU data packet to a second communications device, so that the second communications device obtains the first-type MAC CE, and determines, according to the location of the first-type MAC CE in the MAC PDU data packet, the secondary serving cell corresponding to the first-type MAC CE.

22 Claims, 9 Drawing Sheets

(51) Int. Cl.
*H04W 16/14* (2009.01)
*H04L 5/00* (2006.01)
*H04W 72/12* (2009.01)

(52) U.S. Cl.
CPC ........... *H04W 16/14* (2013.01); *H04W 72/04* (2013.01); *H04W 76/27* (2018.02); *H04L 5/0098* (2013.01); *H04W 72/1215* (2013.01)

(56) References Cited

U.S. PATENT DOCUMENTS

2014/0016555 A1 1/2014 Zhao et al.
2015/0063275 A1 3/2015 Yi et al.
2015/0296522 A1* 10/2015 Bergstrom ............ H04L 1/0001
                                                          370/329
2017/0346614 A1* 11/2017 Tan Bergstrom ....... H04L 5/001

FOREIGN PATENT DOCUMENTS

| | | |
|---|---|---|
| CN | 102244927 A | 11/2011 |
| CN | 102917328 A | 2/2013 |
| CN | 102917463 A | 2/2013 |
| CN | 102917468 A | 2/2013 |
| CN | 102948090 A | 2/2013 |
| CN | 102958073 A | 3/2013 |
| CN | 104518860 A | 4/2015 |
| EP | 2728928 A1 | 5/2014 |
| EP | 3245754 A1 | 11/2017 |
| WO | 2011159126 A2 | 12/2011 |
| WO | 2016114700 A1 | 7/2016 |

* cited by examiner

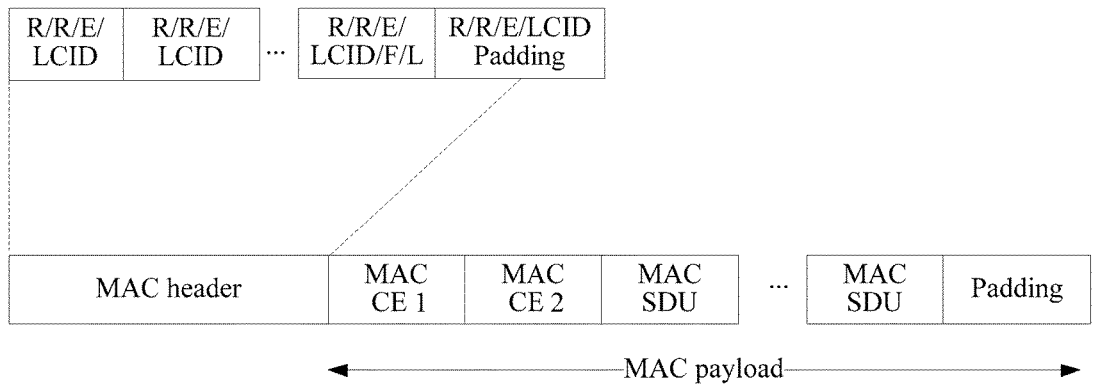

A first communications device generates a MAC PDU data packet, where the MAC PDU data packet includes at least one first-type MAC CE, each first-type MAC CE is used to carry information about at least one secondary serving cell, and the first communications device determines a location of the first-type MAC CE in the MAC PDU data packet according to a secondary serving cell corresponding to the first-type MAC CE — 110

The first communications device sends the MAC PDU data packet to a second communications device, so that the second communications device obtains the first-type MAC CE, and determines, according to the location of the first-type MAC CE in the MAC PDU data packet, the secondary serving cell corresponding to the first-type MAC CE, to obtain information about the secondary serving cell — 120

FIG. 2

| $C_7$ | $C_6$ | $C_5$ | $C_4$ | $C_3$ | $C_2$ | $C_1$ | R |
|---|---|---|---|---|---|---|---|
| P | V | \multicolumn{6}{c} PH (type 2, primary serving cell) |
| R | R | \multicolumn{6}{c} $P_{CMAX,c}$ 1 |
| P | V | \multicolumn{6}{c} PH (type 1, primary serving cell) |
| R | R | \multicolumn{6}{c} $P_{CMAX,c}$ 2 |
| P | V | \multicolumn{6}{c} PH (type 1, secondary serving cell 1) |
| R | R | \multicolumn{6}{c} $P_{CMAX,c}$ 3 |

...

| P | V | PH (type 1, secondary serving cell n) |
|---|---|---|
| R | R | $P_{CMAX,c}$ m |

FIG. 5a

| $C_7$ | $C_6$ | $C_5$ | $C_4$ | $C_3$ | $C_2$ | $C_1$ | R |
|---|---|---|---|---|---|---|---|
| P | V | \multicolumn{6}{c} PH (type 1, secondary serving cell 1) |
| R | R | \multicolumn{6}{c} $P_{CMAX,c}$ 3 |

...

| P | V | PH (type 1, secondary serving cell n) |
|---|---|---|
| R | R | $P_{CMAX,c}$ m |

FIG. 5b

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (type 2, primary serving cell)} |
| R | R | \multicolumn{6}{c}{$P_{CMAX,c}$ 1} |
| P | V | \multicolumn{6}{c}{PH (type 2, primary secondary serving cell)} |
| R | R | \multicolumn{6}{c}{$P_{CMAX,c}$ 2} |
| P | V | \multicolumn{6}{c}{PH (type 1, primary serving cell)} |
| R | R | \multicolumn{6}{c}{$P_{CMAX,c}$ 3} |
| P | V | \multicolumn{6}{c}{PH (type 1, secondary serving cell 1)} |
| R | R | \multicolumn{6}{c}{$P_{CMAX,c}$ 4} |

...

| P | V | PH (type 1, secondary serving cell n) |
|---|---|---|
| R | R | $P_{CMAX,c}$ m |

FIG. 6a

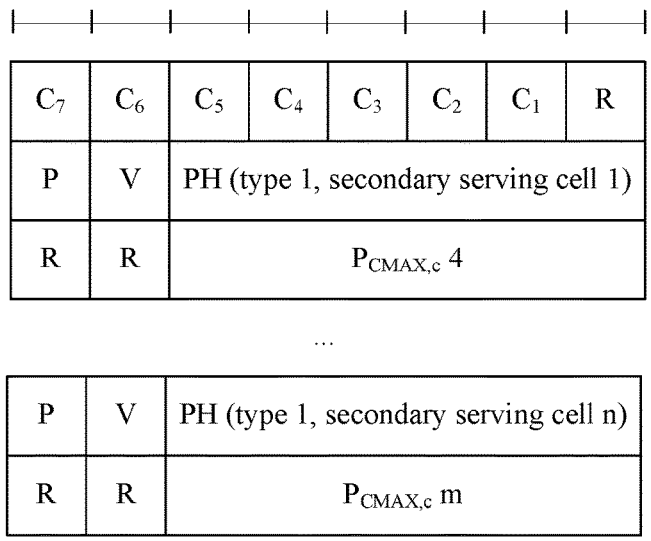

A second communications device obtains a MAC PDU data packet sent by a first communications device, where the MAC PDU data packet includes at least one first-type MAC CE, and each first-type MAC CE is used to carry information about at least one secondary serving cell
— 210

The second communications device obtains the first-type MAC CE, and determines, according to a location of the first-type MAC CE in the MAC PDU data packet, a secondary serving cell corresponding to the first-type MAC CE, to obtain information about the secondary serving cell
— 220

A base station determines that a first secondary serving cell needs to be activated, where all secondary serving cells in a first secondary serving cell group to which the first secondary serving cell belongs are in a deactivated state    / 710

The base station generates a first MAC PDU data packet, where the first MAC PDU data packet includes a first activation/deactivation MAC CE, the first activation/deactivation MAC CE includes indication information, and the indication information is used to instruct to activate the first secondary serving cell or used to instruct to activate the first secondary serving cell group    / 720

The base station sends the first MAC PDU to user equipment by using a primary serving cell, so that the user equipment activates the first secondary serving cell or the first secondary serving cell group    / 730

FIG. 12

COMMUNICATION METHOD AND COMMUNICATIONS DEVICE

CROSS-REFERENCE TO RELATED APPLICATIONS

This application is a continuation of International Application No. PCT/CN2015/079034, filed on May 15, 2015, the disclosure of which is hereby incorporated by reference in its entirety.

TECHNICAL FIELD

The present disclosure relates to the communications field, and more specifically, to a communication method and a communications device.

BACKGROUND

As mobile communications systems develop, services with increasingly high quality can be provided by the systems. To maintain long-term competitive advantages of the 3rd Generation Partner Project (the 3rd Generation Partner Project, 3GPP) and further improve system spectral efficiency and a user throughput, an LTE-Advanced (LTE-Advanced, LTE-A) standard is formulated, and a carrier aggregation (CA, Carrier Aggregation) technology is introduced to LTE-A. Carrier aggregation means that one user equipment (User Equipment, UE) can use multiple serving cells at the same time to perform uplink and downlink communication.

However, currently, a signaling structure supports aggregation of a maximum of eight cells (including one primary serving cell and seven secondary serving cells, where each cell corresponds to a unique cell index, a cell index of the primary serving cell is invariably 0, and values of cell indexes of the secondary serving cells range from 1 to 7).

However, as system spectral efficiency and a user throughput are further improved, more cells (for example, 32 cells) need to be aggregated. Therefore, how to increase a quantity of to-be-aggregated cells or flexibly change a quantity of to-be-aggregated cells while making no change to a signaling structure and making a relatively slight change to a protocol is a problem that urgently needs to be resolved.

SUMMARY

Embodiments of the present disclosure provide a communication method and a communications device, so as to support aggregation of more cells without needing to change a format of a MAC CE, so that a relatively slight change is made to a protocol, and implementation is easy.

According to a first aspect, a communication method is provided, including:

generating, by a first communications device, a Media Access Control (Media Access Control, MAC) protocol data unit (Protocol Data Unit, PDU) data packet, where the MAC PDU data packet includes at least one first-type MAC control element (Control Element, CE), each first-type MAC CE is used to carry information about at least one secondary serving cell, and the first communications device determines a location of the first-type MAC CE in the MAC PDU data packet according to a secondary serving cell corresponding to the first-type MAC CE; and sending, by the first communications device, the MAC PDU data packet to a second communications device, so that the second communications device obtains the first-type MAC CE, and determines, according to the location of the first-type MAC CE in the MAC PDU data packet, the secondary serving cell corresponding to the first-type MAC CE, to obtain information about the secondary serving cell.

With reference to the first aspect, in a first possible implementation of the first aspect, the determining, by the first communications device, a location of the first-type MAC CE in the MAC PDU data packet according to a secondary serving cell corresponding to the first-type MAC CE includes:

determining, by the first communications device, a location of each first-type MAC CE in first-type MAC CEs in the MAC PDU data packet according to the secondary serving cell corresponding to the first-type MAC CE, or a location of each first-type MAC CE in MAC CEs in the MAC PDU data packet, or a location of each first-type MAC CE in MAC service data units SDUs, MAC CEs, and padding units in the MAC PDU data packet.

With reference to the first possible implementation of the first aspect, in a second possible implementation of the first aspect, each first-type MAC CE is used to carry information about N secondary serving cells, and the determining, by the first communications device, a location of the first-type MAC CE in the MAC PDU data packet according to a secondary serving cell corresponding to the first-type MAC CE includes:

if a first MAC CE in the at least one first-type MAC CE carries information about secondary serving cells whose corresponding cell indexes are $(X-1)*N+1$ to $(X-1)*N+N$, determining that the first MAC CE is the $X^{th}$ first-type MAC CE in the MAC PDU data packet; or if a first MAC CE in the at least one first-type MAC CE carries information about secondary serving cells whose corresponding cell indexes are $(X-1)*N+1$ to $(X-1)*N+N$, determining that the first MAC CE is the $X^{th}$ MAC CE in the MAC PDU data packet; or if a first MAC CE in the at least one first-type MAC CE carries information about secondary serving cells whose corresponding cell indexes are $(X-1)*N+1$ to $(X-1)*N+N$, determining that the first MAC CE is the $X^{th}$ unit in the MAC SDUs, the MAC CEs, and the padding units in the MAC PDU data packet.

With reference to the first possible implementation of the first aspect, in a third possible implementation of the first aspect, secondary serving cells of user equipment are grouped by using Radio Resource Control RRC signaling, each first-type MAC CE is used to carry information about a secondary serving cell in a cell group, and the determining, by the first communications device, a location of the first-type MAC CE in the MAC PDU data packet according to a secondary serving cell corresponding to the first-type MAC CE includes:

if a first MAC CE in the at least one first-type MAC CE carries information about a secondary serving cell whose corresponding group number is X, determining that the first MAC CE is the $X^{th}$ first-type MAC CE in the MAC PDU data packet; or if a first MAC CE in the at least one first-type MAC CE carries information about a secondary serving cell whose corresponding group number is X, determining that the first MAC CE is the $X^{th}$ MAC CE in the MAC PDU data packet; or if a first MAC CE in the at least one first-type MAC CE carries information about a secondary serving cell whose corresponding group number is X, determining that the first MAC CE is the $X^{th}$ unit in the MAC service data units SDUs, the MAC CEs, and the padding units in the MAC PDU data packet.

With reference to the first aspect or any one of the foregoing possible implementations of the first aspect, in a fourth possible implementation of the first aspect, the MAC PDU data packet further includes at least one LCID, the at least one LCID is in a one-to-one correspondence with the at least one first-type MAC CE, and each of the at least one LCID is used to indicate that a respective corresponding MAC CE is a first-type MAC CE.

With reference to the first aspect or any one of the foregoing possible implementations of the first aspect, in a fifth possible implementation of the first aspect, each first-type MAC CE includes Ci, a value of i ranges from 1 to 7, and if the first MAC CE in the at least one first-type MAC CE carries information about secondary serving cells whose corresponding cell indexes are $(X-1)*7+1$ to $(X-1)*7+7$, Ci in the first MAC CE corresponds to a secondary serving cell whose cell index is $(X-1)*7+i$.

With reference to the first aspect or any one of the foregoing possible implementations of the first aspect, in a sixth possible implementation of the first aspect, the first-type MAC CE is an activation/deactivation MAC CE, the first communications device is a base station, and the second communications device is user equipment.

With reference to the sixth possible implementation of the first aspect, in a seventh possible implementation of the first aspect, the generating, by a first communications device, a MAC PDU data packet includes:

determining, by the first communications device, that a MAC CE corresponding to a secondary serving cell whose cell index is the largest in secondary serving cells whose activated/deactivated states need to be changed is a MAC CE at a rearmost location in the at least one first-type MAC CE; or determining, by the first communications device, that a MAC CE corresponding to a secondary serving cell whose group number is the largest in secondary serving cells whose activated/deactivated states need to be changed is a MAC CE at a rearmost location in the at least one first-type MAC CE.

With reference to any one of the first aspect or the first to the fifth possible implementations of the first aspect, in an eighth possible implementation of the first aspect, the first-type MAC CE is an extended power headroom report (Power Headroom Report, PHR) MAC CE or a dual connectivity power headroom report dual connectivity PHR MAC CE, the first communications device is user equipment, and the second communications device is a base station.

With reference to the eighth possible implementation of the first aspect, in a ninth possible implementation of the first aspect, the generating, by a first communications device, a MAC PDU data packet includes:

determining, by the first communications device, that a MAC CE corresponding to a secondary serving cell whose cell index is the largest in secondary serving cells whose power headroom information needs to be reported is a MAC CE at a rearmost location in the at least one first-type MAC CE; or determining, by the first communications device, that a MAC CE corresponding to a secondary serving cell whose group number is the largest in secondary serving cells whose power headroom information needs to be reported is a MAC CE at a rearmost location in the at least one first-type MAC CE.

With reference to the eighth or the ninth possible implementation of the first aspect, in a tenth possible implementation of the first aspect, the first MAC CE in the at least one first-type MAC CE further includes power headroom information of a primary serving cell, and a first-type MAC CE after the first one of the at least one first-type MAC CE does not include the power headroom information of the primary serving cell; or the first MAC CE in the at least one first-type MAC CE further includes power headroom information of a primary serving cell and power headroom information of a primary secondary serving cell, and a first-type MAC CE after the first one of the at least one first-type MAC CE includes neither the power headroom information of the primary serving cell nor the power headroom information of the primary secondary serving cell.

With reference to the eighth, the ninth, or the tenth possible implementation of the first aspect, in an eleventh possible implementation of the first aspect, when the first-type MAC CE indicates that power headroom information of a secondary serving cell is carried, and the secondary serving cell has a PUCCH, the first-type MAC CE further includes type-2 power headroom information of the secondary serving cell.

According to a second aspect, a communication method is provided, including:

obtaining, by a second communications device, a Media Access Control MAC protocol data unit PDU data packet sent by a first communications device, where the MAC PDU data packet includes at least one first-type MAC control element CE, and each first-type MAC CE is used to carry information about at least one secondary serving cell; and obtaining, by the second communications device, the first-type MAC CE, and determining, according to a location of the first-type MAC CE in the MAC PDU data packet, a secondary serving cell corresponding to the first-type MAC CE, to obtain information about the secondary serving cell.

With reference to the second aspect, in a first possible implementation of the second aspect, the determining, according to a location of the first-type MAC CE in the MAC PDU data packet, a secondary serving cell corresponding to the first-type MAC CE, to obtain information about the secondary serving cell includes:

determining, by the second communications device according to any one of the following, a secondary serving cell corresponding to each first-type MAC CE:

a location of each first-type MAC CE in first-type MAC CEs in the MAC PDU data packet, a location of each first-type MAC CE in MAC CEs in the MAC PDU data packet, or a location of each first-type MAC CE in MAC SDUs, MAC CEs, and padding units in the MAC PDU data packet.

With reference to the first possible implementation of the second aspect, in a second possible implementation of the second aspect, the determining, according to a location of the first-type MAC CE in the MAC PDU data packet, a secondary serving cell corresponding to the first-type MAC CE, to obtain information about the secondary serving cell includes:

if a first MAC CE in the at least one first-type MAC CE is the $X^{th}$ first-type MAC CE in the MAC PDU data packet, determining that the first MAC CE corresponds to secondary serving cells whose cell indexes are $(X-1)*N+1$ to $(X-1)*N+N$; or if a location of a first MAC CE in the at least one first-type MAC CE is the $X^{th}$ MAC CE in the MAC PDU data packet, determining that the first MAC CE corresponds to secondary serving cells whose cell indexes are (X−1)*N+1 to (X−1)*N+N; or if a location of a first MAC CE in the at least one first-type MAC CE is the $X^{th}$ unit in the MAC SDUs, the MAC CEs, and the padding units in the MAC PDU data packet, determining that the first MAC CE corresponds to secondary serving cells whose cell indexes are (X−1)*N+1 to (X−1)*N+N.

With reference to the first possible implementation of the second aspect, in a third possible implementation of the second aspect, secondary serving cells of user equipment are grouped by using Radio Resource Control RRC signaling, each first-type MAC CE is used to carry information about a secondary serving cell in a cell group, and the determining, according to a location of the first-type MAC CE in the MAC PDU data packet, a secondary serving cell corresponding to the first-type MAC CE, to obtain information about the secondary serving cell includes:

if a location of a first MAC CE in the at least one first-type MAC CE is the $X^{th}$ first-type MAC CE in the MAC PDU data packet, determining that the first MAC CE carries information about a secondary serving cell whose corresponding group number is X; or if a location of a first MAC CE in the at least one first-type MAC CE is the $X^{th}$ MAC CE in the MAC PDU data packet, determining that the first MAC CE carries information about a secondary serving cell whose corresponding group number is X; or if a location of a first MAC CE in the at least one first-type MAC CE is the $X^{th}$ unit in the MAC SDUs, the MAC CEs, and the padding units in the MAC PDU data packet, determining that the first MAC CE carries information about a secondary serving cell whose corresponding group number is X.

With reference to the second aspect or any one of the foregoing possible implementations of the second aspect, in a fourth possible implementation of the second aspect, the MAC PDU data packet further includes at least one LCID, the at least one LCID is in a one-to-one correspondence with the at least one first-type MAC CE, and each of the at least one LCID is used to indicate that a respective corresponding MAC CE is a first-type MAC CE.

With reference to the second aspect or any one of the foregoing possible implementations of the second aspect, in a fifth possible implementation of the second aspect, each first-type MAC CE includes Ci, a value of i ranges from 1 to 7, and if the first MAC CE in the at least one first-type MAC CE carries information about secondary serving cells whose corresponding cell indexes are (X−1)*7+1 to (X−1)*7+7, Ci in the first MAC CE corresponds to a secondary serving cell whose cell index is (X−1)*7+i.

With reference to the second aspect or any one of the foregoing possible implementations of the second aspect, in a sixth possible implementation of the second aspect, the first-type MAC CE is an activation/deactivation MAC CE, the first communications device is a base station, and the second communications device is user equipment.

With reference to any one of the second aspect or the first to the fifth possible implementations of the second aspect, in a seventh possible implementation of the second aspect, the first-type MAC CE is an extended power headroom report extended PHR MAC CE or a dual connectivity power headroom report dual connectivity PHR MAC CE, the first communications device is user equipment, and the second communications device is a base station.

With reference to the seventh possible implementation of the second aspect, in an eighth possible implementation of the second aspect, the first MAC CE in the at least one first-type MAC CE further includes power headroom information of a primary serving cell, a first-type MAC CE after the first one of the at least one first-type MAC CE does not include the power headroom information of the primary serving cell, and the method further includes: obtaining, by the second communications device, the power headroom information of the primary serving cell from the first MAC CE; or the first MAC CE in the at least one first-type MAC CE further includes power headroom information of a primary serving cell and power headroom information of a primary secondary serving cell, a first-type MAC CE after the first one of the at least one first-type MAC CE includes neither the power headroom information of the primary serving cell nor the power headroom information of the primary secondary serving cell, and the method further includes: obtaining, by the second communications device, the power headroom information of the primary serving cell and the power headroom information of the primary secondary serving cell from the first MAC CE.

With reference to the seventh or the eighth possible implementation of the second aspect, in a ninth possible implementation of the second aspect, when power headroom information of a secondary serving cell indicated by the first-type MAC CE is carried, and the secondary serving cell has a PUCCH, the first-type MAC CE further includes type-2 information of the secondary serving cell; and the method further includes:

obtaining, by the second communications device, the type-2 information of the secondary serving cell according to the first-type MAC CE.

According to a third aspect, a communications device is provided, including:

a generation unit, configured to generate a Media Access Control MAC protocol data unit PDU data packet, where the MAC PDU data packet includes at least one first-type MAC control element CE, each first-type MAC CE is used to carry information about at least one secondary serving cell, and the generation unit determines a location of the first-type MAC CE in the MAC PDU data packet according to a secondary serving cell corresponding to the first-type MAC CE; and a sending unit, configured to send the MAC PDU data packet generated by the generation unit to a second communications device, so that the second communications device obtains the first-type MAC CE, and determines, according to the location of the first-type MAC CE in the MAC PDU data packet, the secondary serving cell corresponding to the first-type MAC CE, to obtain information about the secondary serving cell.

With reference to the third aspect, in a first possible implementation of the third aspect, the generation unit is specifically configured to:

determine a location of each first-type MAC CE in first-type MAC CEs in the MAC PDU data packet according to the secondary serving cell corresponding to the first-type MAC CE, or a location of each first-type MAC CE in MAC CEs in the MAC PDU data packet, or a location of each first-type MAC CE in MAC SDUs, MAC CEs, and padding units in the MAC PDU data packet.

With reference to the first possible implementation of the third aspect, in a second possible implementation of the third aspect, each first-type MAC CE is used to carry information about N secondary serving cells, and the generation unit is specifically configured to:

if a first MAC CE in the at least one first-type MAC CE carries information about secondary serving cells whose corresponding cell indexes are (X−1)*N+1 to (X−1)*N+N, determine that the first MAC CE is the $X^{th}$ first-type MAC CE in the MAC PDU data packet; or if a first MAC CE in the at least one first-type MAC CE carries information about secondary serving cells whose corresponding cell indexes are (X−1)*N+1 to (X−1)*N+N, determine that the first MAC CE is the $X^{th}$ MAC CE in the MAC PDU data packet; or if a first MAC CE in the at least one first-type MAC CE carries information about secondary serving cells whose corresponding cell indexes are (X−1)*N+1 to (X−1)*N+N, determine that the first MAC CE is the $X^{th}$ unit in the MAC SDUs, the MAC CEs, and the padding units in the MAC PDU data packet.

With reference to the first possible implementation of the third aspect, in a third possible implementation of the third aspect, secondary serving cells of user equipment are grouped by using Radio Resource Control RRC signaling, each first-type MAC CE is used to carry information about a secondary serving cell in a cell group, and the generation unit is specifically configured to:

if a first MAC CE in the at least one first-type MAC CE carries information about a secondary serving cell whose corresponding group number is X, determine that the first MAC CE is the $X^{th}$ first-type MAC CE in the MAC PDU data packet; or if a first MAC CE in the at least one first-type MAC CE carries information about a secondary serving cell whose corresponding group number is X, determine that the first MAC CE is the $X^{th}$ MAC CE in the MAC PDU data packet; or if a first MAC CE in the at least one first-type MAC CE carries information about a secondary serving cell whose corresponding group number is X, determine that the first MAC CE is the $X^{th}$ unit in the MAC service data units SDUs, the MAC CEs, and the padding units in the MAC PDU data packet.

With reference to the third aspect or any one of the foregoing possible implementations of the third aspect, in a fourth possible implementation of the third aspect, the MAC PDU data packet further includes at least one LCID, the at least one LCID is in a one-to-one correspondence with the at least one first-type MAC CE, and each of the at least one LCID is used to indicate that a respective corresponding MAC CE is a first-type MAC CE.

With reference to the third aspect or any one of the foregoing possible implementations of the third aspect, in a fifth possible implementation of the third aspect, each first-type MAC CE includes Ci, a value of i ranges from 1 to 7, and if the first MAC CE in the at least one first-type MAC CE carries information about secondary serving cells whose corresponding cell indexes are (X−1)*7+1 to (X−1)*7+7, Ci in the first MAC CE corresponds to a secondary serving cell whose cell index is (X−1)*7+i.

With reference to the third aspect or any one of the foregoing possible implementations of the third aspect, in a sixth possible implementation of the third aspect, the first-type MAC CE is an activation/deactivation MAC CE, the communications device is a base station, and the second communications device is user equipment.

With reference to the sixth possible implementation of the third aspect, in a seventh possible implementation of the third aspect, the generation unit is specifically configured to:

determine that a MAC CE corresponding to a secondary serving cell whose cell index is the largest in secondary serving cells whose activated/deactivated states need to be changed is a MAC CE at a rearmost location in the at least one first-type MAC CE; or determine that a MAC CE corresponding to a secondary serving cell whose group number is the largest in secondary serving cells whose activated/deactivated states need to be changed is a MAC CE at a rearmost location in the at least one first-type MAC CE.

With reference to any one of the third aspect or the first to the fifth possible implementations of the third aspect, in an eighth possible implementation of the third aspect, the first-type MAC CE is an extended power headroom report extended PHR MAC CE or a dual connectivity power headroom report dual connectivity PHR MAC CE, the communications device is user equipment, and the second communications device is a base station.

With reference to the eighth possible implementation of the third aspect, in a ninth possible implementation of the third aspect, the generation unit is specifically configured to:

determine that a MAC CE corresponding to a secondary serving cell whose cell index is the largest in secondary serving cells whose power headroom information needs to be reported is a MAC CE at a rearmost location in the at least one first-type MAC CE; or determine that a MAC CE corresponding to a secondary serving cell whose group number is the largest in secondary serving cells whose power headroom information needs to be reported is a MAC CE at a rearmost location in the at least one first-type MAC CE.

With reference to the eighth or the ninth possible implementation of the third aspect, in a tenth possible implementation of the third aspect, the first MAC CE in the at least one first-type MAC CE further includes power headroom information of a primary serving cell, and a first-type MAC CE after the first one of the at least one first-type MAC CE does not include the power headroom information of the primary serving cell; or the first MAC CE in the at least one first-type MAC CE further includes power headroom information of a primary serving cell and power headroom information of a primary secondary serving cell, and a first-type MAC CE after the first one of the at least one first-type MAC CE includes neither the power headroom information of the primary serving cell nor the power headroom information of the primary secondary serving cell.

With reference to the eighth, the ninth, or the tenth possible implementation of the third aspect, in an eleventh possible implementation of the third aspect, when the first-type MAC CE indicates that power headroom information of a secondary serving cell is carried, and the secondary serving cell has a PUCCH, the first-type MAC CE further includes type-2 information of the secondary serving cell.

According to a fourth aspect, a communications device is provided, including:

a receiving unit, configured to receive a Media Access Control MAC protocol data unit PDU data packet sent by a first communications device, where the MAC PDU data packet includes at least one first-type MAC control element CE, and each first-type MAC CE is used to carry information about at least one secondary serving cell; and an obtaining unit, configured to: obtain the first-type MAC CE from the MAC PDU data packet, and determine, according to a location of the first-type MAC CE in the MAC PDU data packet, a secondary serving cell corresponding to the first-type MAC CE, to obtain information about the secondary serving cell.

With reference to the fourth aspect, in a first possible implementation of the fourth aspect, the obtaining unit is specifically configured to:

determine, according to any one of the following, a secondary serving cell corresponding to each first-type MAC CE:

a location of each first-type MAC CE in first-type MAC CEs in the MAC PDU data packet, a location of each first-type MAC CE in MAC CEs in the MAC PDU data packet, or a location of each first-type MAC CE in MAC SDUs, MAC CEs, and padding units in the MAC PDU data packet.

With reference to the first possible implementation of the fourth aspect, in a second possible implementation of the fourth aspect, the obtaining unit is specifically configured to:

if a first MAC CE in the at least one first-type MAC CE is the $X^{th}$ first-type MAC CE in the MAC PDU data packet, determine that the first MAC CE corresponds to secondary serving cells whose cell indexes are $(X-1)*N+1$ to $(X-1)*N+N$; or if a location of a first MAC CE in the at least one first-type MAC CE is the $X^{th}$ MAC CE in the MAC PDU data packet, determine that the first MAC CE corresponds to secondary serving cells whose cell indexes are $(X-1)*N+1$ to $(X-1)*N+N$; or if a location of a first MAC CE in the at least one first-type MAC CE is the $X^{th}$ unit in the MAC SDUs, the MAC CEs, and the padding units in the MAC PDU data packet, determine that the first MAC CE corresponds to secondary serving cells whose cell indexes are $(X-1)*N+1$ to $(X-1)*N+N$.

With reference to the first possible implementation of the fourth aspect, in a third possible implementation of the fourth aspect, secondary serving cells of user equipment are grouped by using Radio Resource Control RRC signaling, each first-type MAC CE is used to carry information about a secondary serving cell in a cell group, and the obtaining unit is specifically configured to:

if a location of a first MAC CE in the at least one first-type MAC CE is the $X^{th}$ first-type MAC CE in the MAC PDU data packet, determine that the first MAC CE carries information about a secondary serving cell whose corresponding group number is X; or if a location of a first MAC CE in the at least one first-type MAC CE is the $X^{th}$ MAC CE in the MAC PDU data packet, determine that the first MAC CE carries information about a secondary serving cell whose corresponding group number is X; or if a location of a first MAC CE in the at least one first-type MAC CE is the $X^{th}$ unit in the MAC SDUs, the MAC CEs, and the padding units in the MAC PDU data packet, determine that the first MAC CE carries information about a secondary serving cell whose corresponding group number is X.

With reference to the fourth aspect or any one of the foregoing possible implementations of the fourth aspect, in a fourth possible implementation of the fourth aspect, the MAC PDU data packet further includes at least one LCID, the at least one LCID is in a one-to-one correspondence with the at least one first-type MAC CE, and each of the at least one LCID is used to indicate that a respective corresponding MAC CE is a first-type MAC CE.

With reference to the fourth aspect or any one of the foregoing possible implementations of the fourth aspect, in a fifth possible implementation of the fourth aspect, each first-type MAC CE includes Ci, a value of i ranges from 1 to 7, and if the first MAC CE in the at least one first-type MAC CE carries information about secondary serving cells whose corresponding cell indexes are $(X-1)*7+1$ to $(X-1)*7+7$, Ci in the first MAC CE corresponds to a secondary serving cell whose cell index is $(X-1)*7+i$.

With reference to the fourth aspect or any one of the foregoing possible implementations of the fourth aspect, in a sixth possible implementation of the fourth aspect, the first-type MAC CE is an activation/deactivation MAC CE, the first communications device is a base station, and the communications device is user equipment.

With reference to any one of the fourth aspect or the first to the fifth possible implementations of the fourth aspect, in a seventh possible implementation of the fourth aspect, the first-type MAC CE is an extended power headroom report extended PHR MAC CE or a dual connectivity power headroom report dual connectivity PHR MAC CE, the first communications device is user equipment, and the communications device is a base station.

With reference to the seventh possible implementation of the fourth aspect, in an eighth possible implementation of the fourth aspect, the first MAC CE in the at least one first-type MAC CE further includes power headroom information of a primary serving cell, a first-type MAC CE after the first one of the at least one first-type MAC CE does not include the power headroom information of the primary serving cell, and the obtaining unit is further configured to obtain the power headroom information of the primary serving cell from the first MAC CE; or the first MAC CE in the at least one first-type MAC CE further includes power headroom information of a primary serving cell and power headroom information of a primary secondary serving cell, a first-type MAC CE after the first one of the at least one first-type MAC CE includes neither the power headroom information of the primary serving cell nor the power headroom information of the primary secondary serving cell, and the obtaining further includes: obtaining the power headroom information of the primary serving cell and the power headroom information of the primary secondary serving cell from the first MAC CE.

With reference to the seventh or the eighth possible implementation of the fourth aspect, in a ninth possible implementation of the fourth aspect, when power headroom information of a secondary serving cell indicated by the first-type MAC CE is carried, and the secondary serving cell has a PUCCH, the first-type MAC CE further includes type-2 information of the secondary serving cell; and the obtaining unit is further configured to:

obtain the type-2 information of the secondary serving cell according to the first-type MAC CE.

According to a fifth aspect, a communication method is provided, including:

determining, by a base station, that a first secondary serving cell needs to be activated, where all secondary serving cells in a first secondary serving cell group to which the first secondary serving cell belongs are in a deactivated state;

generating, by the base station, a first MAC PDU data packet, where the first MAC PDU data packet includes a first activation/deactivation MAC CE, the first activation/deactivation MAC CE includes indication information, and the indication information is used to instruct to activate the first secondary serving cell or used to instruct to activate the first secondary serving cell group; and sending, by the base station, the first MAC PDU to user equipment by using a primary serving cell, so that the user equipment activates the first secondary serving cell or the first secondary serving cell group.

With reference to the fifth aspect, in a first possible implementation of the fifth aspect, the first activation/deactivation MAC CE is used to indicate activated/deactivated states of N secondary serving cells, where different secondary serving cells in the N secondary serving cells respectively belong to different secondary serving cell groups in N secondary serving cell groups.

With reference to the first possible implementation of the fifth aspect, in a second possible implementation of the fifth aspect, when the first activation/deactivation MAC CE is used to indicate the activated/deactivated states of the N secondary serving cells, the determining, by a base station, that a first secondary serving cell needs to be activated includes: determining, by the base station according to a fact that a second secondary serving cell needs to be activated, that the first secondary serving cell needs to be activated, where the second secondary serving cell belongs to the first secondary serving cell group; and after the user equipment activates the first secondary serving cell, the method further includes:

generating, by the base station, a second MAC PDU data packet, where the first MAC PDU data packet includes a second activation/deactivation MAC CE, the second activation/deactivation MAC CE corresponds to the first secondary serving cell group and is used to indicate an activated/deactivated state of a secondary serving cell in the first secondary serving cell group, and the second secondary serving cell is in an activated state in the second activation/deactivation MAC CE; and sending, by the base station, the second MAC PDU to the user equipment by using the first secondary serving cell, so that the user equipment activates the second secondary serving cell.

With reference to the fifth aspect, in a third possible implementation of the fifth aspect, the first activation/deactivation MAC CE is used to indicate activated/deactivated states of N secondary serving cell groups.

According to a sixth aspect, a communication method is provided, including:

receiving, by user equipment, a first MAC PDU data packet by using a primary serving cell, where the first MAC PDU data packet includes a first activation/deactivation MAC CE, the first activation/deactivation MAC CE includes indication information, and the indication information is used to instruct to activate a first secondary serving cell or used to instruct to activate a first secondary serving cell group; and activating, by the user equipment, the first secondary serving cell or the first secondary serving cell group according to the first MAC CE.

With reference to the sixth aspect, in a first possible implementation of the sixth aspect, the first activation/deactivation MAC CE is used to indicate activated/deactivated states of N secondary serving cells, where different secondary serving cells in the N secondary serving cells respectively belong to different secondary serving cell groups in N secondary serving cell groups.

With reference to the first possible implementation of the sixth aspect, in a second possible implementation of the sixth aspect, when the first activation/deactivation MAC CE is used to indicate the activated/deactivated states of the N secondary serving cells, after the activating the first secondary serving cell, the method further includes:

receiving, by the user equipment, a second MAC PDU data packet by using the first secondary serving cell, where the second MAC PDU data packet includes a second activation/deactivation MAC CE, the second activation/deactivation MAC CE corresponds to the first secondary serving cell group and is used to indicate an activated/deactivated state of a secondary serving cell in the first secondary serving cell group, the second secondary serving cell and the first secondary serving cell belong to the first secondary serving cell group, and the second secondary serving cell is in an activated state in the second activation/deactivation MAC CE; and activating, by the user equipment, the second cell according to the second MAC PDU data packet.

With reference to the sixth aspect, in a third possible implementation of the sixth aspect, the first activation/deactivation MAC CE is used to indicate activated/deactivated states of N secondary serving cell groups.

According to a seventh aspect, a base station is provided, including:

a determining unit, configured to determine that a first secondary serving cell needs to be activated, where all secondary serving cells in a first secondary serving cell group to which the first secondary serving cell belongs are in a deactivated state;

a generation unit, configured to generate a first MAC PDU data packet, where the first MAC PDU data packet includes a first activation/deactivation MAC CE, the first activation/deactivation MAC CE includes indication information, and the indication information is used to instruct to activate the first secondary serving cell or used to instruct to activate the first secondary serving cell group; and a sending unit, configured to send the first MAC PDU to user equipment by using a primary serving cell, so that the user equipment activates the first secondary serving cell or the first secondary serving cell group.

With reference to the seventh aspect, in a first possible implementation of the seventh aspect, the first activation/deactivation MAC CE is used to indicate activated/deactivated states of N secondary serving cells, where different secondary serving cells in the N secondary serving cells respectively belong to different secondary serving cell groups in N secondary serving cell groups.

With reference to the first possible implementation of the seventh aspect, in a second possible implementation of the seventh aspect, when the first activation/deactivation MAC CE is used to indicate the activated/deactivated states of the N secondary serving cells, the determining unit is further configured to determine, according to a fact that a second secondary serving cell needs to be activated, that the first secondary serving cell needs to be activated, where the second secondary serving cell belongs to the first secondary serving cell group; and after the user equipment activates the first secondary serving cell, the generation unit is further configured to generate a second MAC PDU data packet, where the first MAC PDU data packet includes a second activation/deactivation MAC CE, the second activation/deactivation MAC CE corresponds to the first secondary serving cell group and is used to indicate an activated/deactivated state in the first secondary serving cell group, and the second secondary serving cell is in an activated state in the second activation/deactivation MAC CE; and the sending unit is further configured to send the second MAC PDU to the user equipment by using the first secondary serving cell, so that the second user equipment activates the second secondary serving cell.

With reference to the seventh aspect, in a third possible implementation of the seventh aspect, the first activation/deactivation MAC CE is used to indicate activated/deactivated states of N secondary serving cell groups.

According to an eighth aspect, user equipment is provided, including:

a receiving unit, configured to receive a first MAC PDU data packet by using a primary serving cell, where the first MAC PDU data packet includes a first activation/deactivation MAC CE, the first activation/deactivation MAC CE includes indication information, and the indication information is used to instruct to activate a first secondary serving cell or used to instruct to activate a first secondary serving cell group; and an activation unit, configured to activate the first secondary serving cell or the first secondary serving cell group according to the first MAC CE.

With reference to the eighth aspect, in a first possible implementation of the eighth aspect, the first activation/deactivation MAC CE is used to indicate activated/deactivated states of N secondary serving cells, where different secondary serving cells in the N secondary serving cells respectively belong to different secondary serving cell groups in N secondary serving cell groups.

With reference to the first possible implementation of the eighth aspect, in a second possible implementation of the eighth aspect, when the first activation/deactivation MAC CE is used to indicate the activated/deactivated states of the N secondary serving cells, after the first secondary serving cell is activated, the receiving unit is further configured to receive a second MAC PDU data packet by using the first secondary serving cell, where the second MAC PDU data packet includes a second activation/deactivation MAC CE, the second activation/deactivation MAC CE corresponds to the first secondary serving cell group and is used to indicate an activated/deactivated state in the first secondary serving cell group, the second secondary serving cell and the first secondary serving cell belong to the first secondary serving cell group, and the second secondary serving cell is in an activated state in the second activation/deactivation MAC CE; and the activation unit is further configured to activate the second cell according to the second MAC PDU data packet.

With reference to the eighth aspect, in a third possible implementation of the eighth aspect, the first activation/deactivation MAC CE is used to indicate activated/deactivated states of N secondary serving cell groups.

Therefore, in the embodiments of the present invention, when generating a MAC PDU data packet, a first communications device determines a location of a first-type MAC CE in the MAC PDU data packet according to a secondary serving cell corresponding to the first-type MAC CE, so that when parsing the MAC PDU data packet, a second communications device can determine, according to a location of each first-type MAC CE in the MAC PDU data packet, a secondary serving cell corresponding to each first-type MAC CE, to obtain information about the secondary serving cell. Therefore, when a quantity of cells that need to be aggregated increases, multiple first-type MAC CEs may be added to one MAC PDU data packet, the first-type MAC CEs respectively carry information about different secondary serving cells, and it is determined, based on a location of a MAC CE in MAC PDU data, secondary serving cells about which information is carried in the MAC CE. In this way, a format of the MAC CE does not need to be changed (for example, a change that is brought when a group number of the MAC CE is increased or a length of the MAC CE is increased) to support aggregation of more cells, so that a relatively slight change is made to a protocol, and implementation is easy.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a format diagram of an applicable MAC PDU data packet according to an embodiment of the present invention;

FIG. 2 is a schematic flowchart of a communication method according to another embodiment of the present invention;

FIG. 5a is a format diagram of an applicable MAC CE according to another embodiment of the present invention;

FIG. 5b is a format diagram of an applicable MAC CE according to another embodiment of the present invention;

FIG. 6a is a format diagram of an applicable MAC CE according to another embodiment of the present invention;

FIG. 6b is a format diagram of an applicable MAC CE according to another embodiment of the present invention;

FIG. 7 is a schematic flowchart of a communication method according to another embodiment of the present invention;

FIG. 12 is a schematic flowchart of a communication method according to another embodiment of the present invention;

DESCRIPTION OF EMBODIMENTS

Figure 3A:
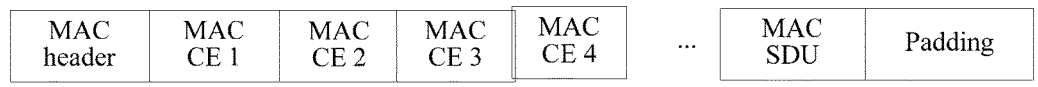
FIG. 3a is a format diagram of an applicable MAC PDU data packet according to another embodiment of the present invention.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The technical solutions of the present disclosure may be applied to various communications systems, such as: a GSM, a Code Division Multiple Access (CDMA, Code Division Multiple Access) system, Wideband Code Division Multiple Access (WCDMA, Wideband Code Division Multiple Access Wireless), a general packet radio service (GPRS, General Packet Radio Service), and Long Term Evolution (LTE, Long Term Evolution).

User equipment (UE, User Equipment), also referred to as a mobile terminal (Mobile Terminal), a mobile user equipment, and the like, may communicate with one or more core networks by using a radio access network (for example, RAN, Radio Access Network). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges voice and/or data with the radio access network.

A base station may be a base transceiver station (BTS, Base Transceiver Station) in GSM or CDMA, or may be a NodeB (NodeB) in WCDMA, or may be an evolved NodeB (eNB or e-NodeB, evolutional Node B) in LTE. This is not limited in the present invention. However, for ease of description, the following embodiments are described by using an NodeB as an example.

To understand the present invention more clearly, the following briefly describes a format of a MAC PDU data packet mentioned in the present invention with reference to FIG. 1.

As shown in FIG. 1, a MAC PDU includes a MAC header (header) and a MAC payload (payload). The MAC payload includes zero or at least one MAC CE (Control element, control element), zero or at least one MAC service data unit (Service Data Unit, SDU), and optional padding (padding).

The MAC header includes multiple sub-headers (sub-header). Each sub-header includes an R/R/E/LCID field. R represents a reserved field. E represents whether a current sub-header is the last sub-header in the MAC PDU. An LCID is a logical channel identifier (logic Channel ID).

The sub-headers sequentially correspond to units (MAC CEs, MAC SDUs, or padding) in the MAC payload. That is, the first sub-header corresponds to the first unit, the second sub-header corresponds to the second unit, and so on.

A value of an LCID in a sub-header may represent a type of a unit corresponding to the sub-header. For example, when a value of an LCID in a sub-header in a downlink MAC PDU data packet is 11011, it indicates that a corresponding location in the MAC payload is an activation/deactivation MAC CE. When a value of an LCID in a sub-header in an uplink MAC PDU data packet is 11001, it indicates that a corresponding location in the MAC payload is an extended power headroom report (Power Headroom Report, PHR) MAC CE. When a value of an LCID in a sub-header in an uplink MAC PDU data packet is 11000, it indicated that a corresponding location in the MAC payload is a dual connectivity PHR MAC CE.

A signaling structure in an existing protocol supports aggregation of a maximum of eight cells (including one primary serving cell and seven secondary serving cells), that is, a structure of the MAC CE in FIG. 1 is shown as follows:

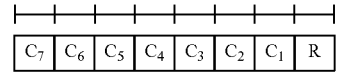

However, as system spectral efficiency and a user throughput are further improved, more cells (for example, 32 cells) need to be aggregated. Therefore, how to increase a quantity of to-be-aggregated cells or flexibly change a quantity of to-be-aggregated cells while making no change to a signaling structure, that is, maintaining a structure of a MAC CE and a structure of a sub-header, is a problem that urgently needs to be resolved.

Therefore, the present invention provides the following technical solutions to resolve the problem. Detailed descriptions are provided below with reference to FIG. 2 to FIG. 15.

FIG. 2 is a schematic flowchart of a communication method 100 according to an embodiment of the present invention. As shown in FIG. 2, the method 100 includes the following steps:

110. A first communications device generates a MAC PDU data packet, where the MAC PDU data packet includes at least one first-type MAC CE, each first-type MAC CE is used to carry information about at least one secondary serving cell, and the first communications device determines a location of the first-type MAC CE in the MAC PDU data packet according to a secondary serving cell corresponding to the first-type MAC CE.

120. The first communications device sends the MAC PDU data packet to a second communications device, so that the second communications device obtains the first-type MAC CE, and determines, according to the location of the first-type MAC CE in the MAC PDU data packet, the secondary serving cell corresponding to the first-type MAC CE, to obtain information about the secondary serving cell.

Specifically, when the first communications device determines that a MAC PDU data packet needs to be generated, the first communications device may determine secondary serving cells about which information needs to be carried in a MAC CE of a particular type in the MAC PDU data packet, and then determine, according to a secondary serving cell corresponding to each MAC CE of this type (where that a MAC CE corresponds to a secondary serving cell means that information about the secondary serving cell needs to be carried in the MAC CE), a location of each MAC CE of this type in the MAC PDU data packet. Then the first communications device encapsulates the MAC PDU data packet according to the location of each MAC CE of this type in the MAC PDU data packet, and sends the encapsulated MAC PDU data packet to the second communications device, so that after obtaining the MAC PDU data packet, the second communications device may determine, according to the location of each MAC CE of this type in the MAC PDU data packet, the secondary serving cell corresponding to each MAC CE of this type, to obtain information about the secondary serving cell.

Therefore, in this embodiment of the present invention, when generating a MAC PDU data packet, a first communications device determines a location of a first-type MAC CE in the MAC PDU data packet according to a secondary serving cell corresponding to the first-type MAC CE, so that when parsing the MAC PDU data packet, a second communications device can determine, according to a location of each first-type MAC CE in the MAC PDU data packet, a secondary serving cell corresponding to each first-type MAC CE, to obtain information about the secondary serving cell. Therefore, when a quantity of cells that need to be aggregated increases, multiple first-type MAC CEs may be added to one MAC PDU data packet, the first-type MAC CEs respectively carry information about different secondary serving cells, and it is determined, based on a location of a MAC CE in MAC PDU data, secondary serving cells about which information is carried in the MAC CE. In this way, a format of the MAC CE does not need to be changed (for example, a change that is brought when a group number of the MAC CE is increased or a length of the MAC CE is increased) to support aggregation of more cells, so that a relatively slight change is made to a protocol, and implementation is easy.

Optionally, this embodiment of the present invention may be used for intra-base station cell aggregation, or may be used for inter-base station cell aggregation.

Optionally, in this embodiment of the present invention, to support aggregation of more cells, a value range of a cell index is extended to greater than 7, for example, extended to 31.

Optionally, in this embodiment of the present invention, the first-type MAC CE may be an activation/deactivation MAC CE (Activation/Deactivation MAC CE), the first communications device is a base station, and the second communications device is user equipment. Alternatively, the first-type MAC CE is an extended power headroom report extended PHR MAC CE or a dual connectivity power headroom report dual connectivity PHR MAC CE, the first communications device is user equipment, and the second communications device is a base station.

Optionally, in this embodiment of the present invention, the MAC PDU data packet further includes at least one LCID, the at least one LCID is in a one-to-one correspondence with the at least one first-type MAC CE, and each of the at least one LCID is used to indicate that a respective corresponding MAC CE is a first-type MAC CE.

Optionally, in this embodiment of the present invention, each first-type MAC CE includes Ci, a value of i ranges from 1 to 7 (that is, each first-type MAC CE includes C1, C2, . . . , and C7), and if a first MAC CE in the at least one first-type MAC CE carries information about secondary serving cells whose corresponding cell indexes are $(X-1)*7+1$ to $(X-1)*7+7$, Ci in the first MAC CE corresponds to a secondary serving cell whose cell index is $(X-1)*7+i$.

It should be understood that, when the first-type MAC CE is an activation/deactivation MAC CE, a value of Ci may indicate whether a corresponding cell is in an activated state or a deactivated state. For example, 1 indicates an activated state, and 0 indicates a deactivated state.

When the first-type MAC CE is an extended power headroom report MAC CE or a dual connectivity power headroom report MAC CE, a value of Ci may indicate whether power headroom information of a corresponding cell has been reported. For example, 1 indicates that the power headroom information of the corresponding cell has been reported, and 0 indicates that the power headroom information of the corresponding cell has not been reported.

It should be understood that, when the first-type MAC CE is an extended power headroom report MAC CE or a dual connectivity power headroom report MAC CE, the MAC CE may further include other information in addition to Ci, for example, as shown in FIG. 5a, FIG. 5b, FIG. 6a, and FIG. 6b.

It should be understood that, in this embodiment of the present invention, that each first-type MAC CE is used to carry information about at least one secondary serving cell means that each first-type MAC CE is used to carry information about a quantity of secondary serving cells corresponding to each such MAC CE. For example, if eight secondary serving cells in total are configured for user equipment, seven Ci (that is, a value of i ranges from 1 to 7) in the first first-type MAC CE in the MAC PDU data packet each correspond to information about a secondary serving cell. The second first-type MAC CE may pad one of Ci (that is, the value of i ranges from 1 to 7) with information about a corresponding secondary serving cell, the other bits may be invalid information, and a receive end may not parse the invalid information.

Figure 4A:
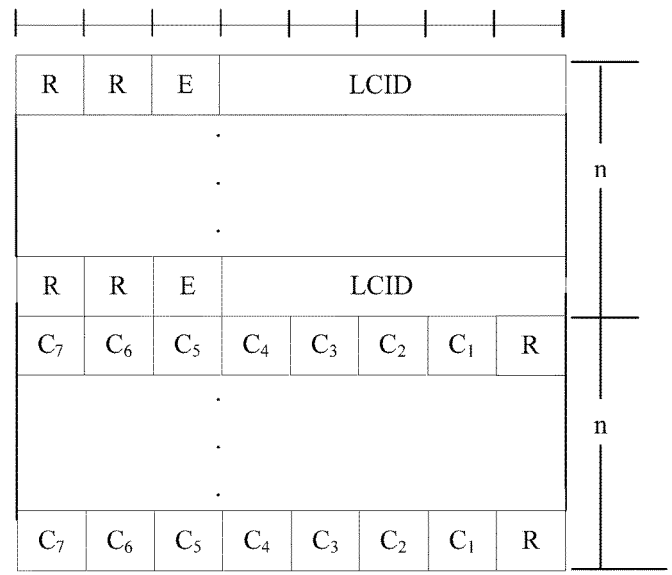
FIG. 4a is a format diagram of an applicable MAC PDU data packet according to another embodiment of the present invention.

FIG. 4a shows partial information about a MAC PDU data packet to which a first-type MAC CE being an activation/deactivation MAC CE belongs, including n LCIDs and n first-type MAC CEs in total. The n LCIDs are in a one-to-one correspondence with the n first-type MAC CEs. Each first-type MAC CE includes Ci, a value of i ranges from 1 to 7, and if a first MAC CE in at least one first-type MAC CE carries information about secondary serving cells whose cell indexes are $(X-1)*7+1$ to $(X-1)*7+7$, Ci in the first MAC CE corresponds to a secondary serving cell whose cell index is $(X-1)*7+i$. In FIG. 4a, R represents a reserved field, and E represents whether a current sub-header is the last sub-header in the MAC PDU.

Figure 4B:
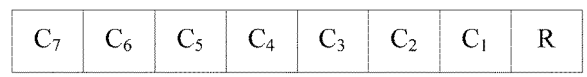
FIG. 4b is a format diagram of an applicable MAC CE according to another embodiment of the present invention.

FIG. 4b is a format diagram of an applicable MAC CE according to an embodiment of the present invention. In FIG. 4b, a MAC CE includes $C_1$, $C_2$, $C_3$, $C_3$, $C_4$, $C_5$, $C_6$, and $C_7$, which respectively indicate information about corresponding secondary serving cells. For example, if the MAC CE is an activation/deactivation MAC CE, $C_1$, $C_2$, $C_3$, $C_3$, $C_4$, $C_5$, $C_6$, and $C_7$ indicate activated/deactivated states of corresponding cells. For example, 1 indicates an activated state, and 0 indicates a deactivated state. If the MAC CE is an extended power headroom report MAC CE or a dual connectivity power headroom report MAC CE, $C_1$, $C_2$, $C_3$, $C_3$, $C_4$, $C_5$, $C_6$, and $C_7$ indicate whether power headroom information of corresponding cells has been reported. For example, 1 indicates that the power headroom information of the corresponding cells has been reported, and 0 indicates that the power headroom information of the corresponding cells has not been reported. It should be understood that, when the MAC CE is an extended power headroom report MAC CE or a dual connectivity power headroom report MAC CE, the MAC CE further includes other information, for example, as shown in FIG. 5a, FIG. 5b, FIG. 6a, and FIG. 6b.

Optionally, in this embodiment of the present invention, the determining, by the first communications device, a location of the first-type MAC CE in the MAC PDU data packet according to a secondary serving cell corresponding to the first-type MAC CE includes:

determining, by the first communications device, a location of each first-type MAC CE in first-type MAC CEs in the MAC PDU data packet according to the secondary serving cell corresponding to the first-type MAC CE, or a location of each first-type MAC CE in MAC CEs in the MAC PDU data packet, or a location of each first-type MAC CE in MAC SDUs, MAC CEs, and padding units in the MAC PDU data packet.

That is, a MAC CE of a particular type corresponding to information about which secondary serving cells may be determined by a location of the MAC CE in all MAC CEs of this type, or may be determined by a location of the MAC CE in all MAC CEs, or may be determined by a location of the MAC CE in all MAC SDUs, MAC CEs, and padding units.

For ease of understanding, detailed descriptions are provided below with reference to two cases.

In the first case, secondary serving cells of user equipment are grouped by using Radio Resource Control RRC signaling, each cell group is allocated one group number, each first-type MAC CE is used to carry information about a secondary serving cell in a cell group, and the determining, by the first communications device, a location of the first-type MAC CE in the MAC PDU data packet according to a secondary serving cell corresponding to the first-type MAC CE includes:

if a first MAC CE in the at least one first-type MAC CE carries information about a secondary serving cell whose corresponding group number is X, determining that the first MAC CE is the $X^{th}$ first-type MAC CE in the MAC PDU data packet; or if a first MAC CE in the at least one first-type MAC CE carries information about a secondary serving cell whose corresponding group number is X, determining that the first MAC CE is the $X^{th}$ MAC CE in the MAC PDU data packet; or if a first MAC CE in the at least one first-type MAC CE carries information about a secondary serving cell whose corresponding group number is X, determining that the first MAC CE is the $X^{th}$ unit in all the MAC service data units SDUs, MAC CEs, and padding units in the MAC PDU data packet.

Specifically, the base station may group the secondary serving cells of the user equipment by using the RRC signaling. Each first-type MAC CE is used to carry information about a secondary serving cell in a cell group. Bits in each MAC CE may be mapped to secondary serving cells in the following two manners.

1). Each cell is allocated one intra-cell group index, and Ci corresponds to a secondary serving cell whose intra-cell group index is i.

2). Values of cell indexes of secondary serving cells respectively and sequentially correspond to Ci. For example, a secondary serving cell whose cell index is the smallest in cells in the cell group corresponds to C1, a secondary serving cell whose cell index is immediately greater than the smallest cell index in the cells in the cell group corresponds to C2, and so on.

In the second case, each first-type MAC CE is used to carry information about N secondary serving cells, and the determining, by the first communications device, a location of the first-type MAC CE in the MAC PDU data packet according to a secondary serving cell corresponding to the first-type MAC CE includes:

if a first MAC CE in the at least one first-type MAC CE carries information about secondary serving cells whose corresponding cell indexes are (X−1)*N+1 to (X−1)*N+N, determining that the first MAC CE is the $X^{th}$ first-type MAC CE in the MAC PDU data packet, that is, determining that the $X^{th}$ first-type MAC CE in the MAC PDU data packet carries the information about the secondary serving cells whose corresponding cell indexes are (X−1)*N+1 to (X−1)*N+N, where preferably, if the MAC PDU data packet carries multiple first-type MAC CEs, the multiple first-type MAC CEs are consecutively stored; or if a first MAC CE in the at least one first-type MAC CE carries information about secondary serving cells whose corresponding cell indexes are (X−1)*N+1 to (X−1)*N+N, determining that the first MAC CE is the $X^{th}$ MAC CE in the MAC PDU data packet, that is, determining that the $X^{th}$ MAC CE in the MAC PDU data packet carries the information about the secondary serving cells whose corresponding cell indexes are (X−1)*N+1 to (X−1)*N+N; or if a first MAC CE in the at least one first-type MAC CE carries information about secondary serving cells whose corresponding cell indexes are (X−1)*N+1 to (X−1)*N+N, determining that the first MAC CE is the $X^{th}$ unit in all the MAC SDUs, MAC CEs, and padding units in the MAC PDU data packet, that is, determining that the $X^{th}$ unit in all the MAC SDUs, MAC CEs, and padding units in the MAC PDU data packet carries the information about the secondary serving cells whose corresponding cell indexes are (X−1)*N+1 to (X−1)*N+N.

For ease of understanding, detailed descriptions are provided below with reference to FIG. 3a and FIG. 3b. In all the descriptions provided with reference to FIG. 3a and FIG. 3b, it is assumed that one MAC CE supports seven secondary serving cells, a MAC PDU data packet supports a maximum of 31 secondary serving cells, and cell indexes (index) are 1 to 31. In addition, it is assumed that a first-type MAC CE is an activation/deactivation MAC CE, the MAC PDU data packet needs to include at least an activation/deactivation MAC CE corresponding to cell indexes 8 to 14. It is similar to another case, and details are not described herein again, for example, the first-type MAC CE is an extended PHR MAC CE.

If a MAC CE of a particular type corresponding to information about which secondary serving cells may be determined by a location of the MAC CE in all MAC CEs of this type in the MAC PDU data packet, because at least the activation/deactivation MAC CE corresponding to the cell indexes 8 to 14 is included, activated/deactivated states of secondary serving cells whose cell indexes are 8 to 14 need to be added to the second MAC CE in all first-type MAC CEs. For example, in FIG. 3a and FIG. 3b, if a MAC CE 2 is an activation/deactivation MAC CE corresponding to the secondary serving cells whose cell indexes are 8 to 14, a MAC CE 1 is an activation/deactivation MAC CE corresponding to secondary serving cells whose cell indexes are 1 to 7. If a MAC CE 3 is an activation/deactivation MAC CE corresponding to the secondary serving cells whose cell indexes are 8 to 14, a MAC CE 1 or a MAC CE 2 is an activation/deactivation MAC CE corresponding to secondary serving cells whose cell indexes are 1 to 7. If a MAC CE 4 is an activation/deactivation MAC CE corresponding to the secondary serving cells whose cell indexes are 8 to 14, a MAC CE 1, a MAC CE 2, or a MAC CE 3 is an activation/deactivation MAC CE corresponding to secondary serving cells whose cell indexes are 1 to 7.

If a MAC CE of a particular type corresponding to information about which secondary serving cells may be determined by a location of the MAC CE in all MAC CEs in the MAC PDU data packet, because at least the activation/deactivation MAC CE corresponding to the cell indexes 8 to 14 is included, activated/deactivated states corresponding to the cell indexes 8 to 14 need to be added to the second MAC CE in all the MAC CEs. For example, in 3a and FIG. 3b, a MAC CE 2 is an activation/deactivation MAC CE corresponding to the cell indexes 8 to 14. A MAC CE 1 may be an activation/deactivation MAC CE corresponding to cell indexes 1 to 7, or may be a MAC CE of another type.

If a MAC CE of a particular type corresponding to information about which secondary serving cells may be determined by a location of the MAC CE in all MAC SDUs, MAC CEs, and padding units in the MAC PDU data packet, because at least the activation/deactivation MAC CE corresponding to the cell indexes 8 to 14 is included, the second unit needs to be determined as an activation/deactivation MAC CE corresponding to the cell indexes 8 to 14. For example, in 3a, a MAC CE 2 is an activation/deactivation MAC CE corresponding to the cell indexes 8 to 14. A MAC CE 1 may be an activation/deactivation MAC CE corresponding to cell indexes 1 to 7, or may be a MAC CE of another type. In FIG. 3b, a MAC CE 1 is an activation/deactivation MAC CE corresponding to the cell indexes 8 to 14.

Optionally, in this embodiment of the present invention, when the first-type MAC CE is an activation/deactivation MAC CE, the base station determines that a MAC CE corresponding to a secondary serving cell whose cell index is the largest in secondary serving cells whose activated/deactivated states need to be changed is a MAC CE at a rearmost location in the at least one first-type MAC CE.

That is, when the base station generates the MAC PDU data packet, the base station may not need to add configured MAC CEs corresponding to all secondary serving cells to the MAC PDU data packet, but determine, according to whether an activated/deactivated state of a secondary serving cell needs to be changed and the largest cell index in indexes of secondary serving cells whose activated/deactivated states need to be changed, MAC CEs that need to be carried. The MAC PDU data packet does not need to carry such a MAC CE that the smallest index in secondary serving cells corresponding to the MAC CE is greater than the largest cell index in the cell indexes of the secondary serving cells whose activated/deactivated states need to be changed. Descriptions are provided below with reference to an example 1 and an example 2.

In the example 1, it is assumed that 21 secondary serving cells are configured, each MAC CE of a particular type carries information about seven secondary serving cells in total, a MAC CE 1 carries information about secondary serving cells whose indexes are 1 to 7, a MAC CE 2 carries information about secondary serving cells whose indexes are 8 to 14, and a MAC CE 3 carries states of secondary serving cells whose indexes are 15 to 21. If states of secondary serving cells whose cell indexes are 5 and 13 need to be changed, the MAC CE 1 and the MAC CE 2 need to be included in the MAC PDU data packet. There may be the following three cases for an order of the MAC CE 1 and the MAC CE 2.

1). If a MAC CE of a particular type corresponding to information about which secondary serving cells may be determined by a location of the MAC CE in all first-type MAC CEs in the MAC PDU data packet, the MAC CE 1 and the MAC CE 2 need to be added to the MAC PDU data packet, a location of the MAC CE 1 is before that of the MAC CE 2, and absolute locations of the MAC CE 1 and the MAC CE 2 in the MAC PDU data packet are not limited.

2). If a MAC CE of a particular type corresponding to information about which secondary serving cells may be determined by a location of the MAC CE in all MAC CEs in the MAC PDU data packet, the MAC CE 1 and the MAC CE 2 need to be added to the MAC PDU data packet, the MAC CE 1 needs to be the first MAC CE in all the MAC CEs, and the MAC CE 2 needs to be the second MAC CE in all the MAC CEs.

3). If a MAC CE of a particular type corresponding to information about which secondary serving cells may be determined by a location of the MAC CE in all MAC SDUs, MAC CEs, and padding units in the MAC PDU data packet, the MAC CE 1 and the MAC CE 2 need to be added to the MAC PDU data packet, the MAC CE 1 is the first unit in all the MAC SDUs, MAC CEs, and padding units, and the MAC CE 2 needs to be the second unit in all the MAC SDUs, MAC CEs, and padding units.

In the example 2, it is assumed that 21 secondary serving cells are configured, each MAC CE of a particular type carries information about seven secondary serving cells in total, a MAC CE 1 carries information about secondary serving cells whose indexes are 1 to 7, a MAC CE 2 carries information about secondary serving cells whose indexes are 8 to 14, and a MAC CE 3 carries states of secondary serving cells whose indexes are 15 to 21. If a state of a secondary serving cell whose cell index is 13 needs to be changed, at least the MAC CE 2 needs to be included in the MAC PDU data packet. There may be the following three cases for whether another MAC CE needs to be included or for an order of MAC CEs.

1). If a MAC CE of a particular type corresponding to information about which secondary serving cells may be determined by a location of the MAC CE in all first-type MAC CEs in the MAC PDU data packet, because the secondary serving cell whose state needs to be changed (the secondary serving cell whose cell index is 13) belongs to the indexes 8 to 14, that is, the second MAC CE of this type needs to be carried, the MAC CE 1 needs to be carried before the MAC CE 2, that is, the MAC CE 1 and the MAC CE 2 need to be added to the MAC PDU data packet, a location of the MAC CE 1 is before that of the MAC CE 2, and absolute locations of the MAC CE 1 and the MAC CE 2 in the MAC PDU data packet are not limited.

2). If a MAC CE of a particular type corresponding to information about which secondary serving cells may be determined by a location of the MAC CE in all MAC CEs in the MAC PDU data packet, because the secondary serving cell whose state needs to be changed (the secondary serving cell whose cell index is 13) belongs to the indexes 8 to 14, that is, the second MAC CE needs to be carried, a MAC CE needs to be carried before the MAC CE 2, and the MAC CE before the MAC CE 2 may be the MAC CE 1 or may be a MAC CE of another type.

3). If a MAC CE of a particular type corresponding to information about which secondary serving cells may be determined by a location of the MAC CE in all MAC SDUs, MAC CEs, and padding units in the MAC PDU data packet, because the secondary serving cell whose state needs to be changed (the secondary serving cell whose cell index is 13) belongs to the indexes 8 to 14, that is, the second unit in all the MAC SDUs, MAC CEs, and padding units is carried, the MAC CE 1 needs to be carried before the MAC CE 2, that is, the MAC CE 2 need to be added to the MAC PDU data packet, the MAC CE 2 is the second unit in all the MAC SDUs, MAC CEs, and padding units, and a unit before the MAC CE 2 may be the MAC CE 1, a MAC CE of another type, a MAC SDU, or the like.

Alternatively, the first communications device determines that a MAC CE corresponding to a secondary serving cell whose group number is the largest in secondary serving cells whose activated/deactivated states need to be changed is a MAC CE at a rearmost location in the at least one first-type MAC CE.

For example, similar to the description of the foregoing example 1, it is assumed that 21 secondary serving cells are configured, each MAC CE of a particular type carries information about seven secondary serving cells in total, a MAC CE 1 carries information about secondary serving cells whose indexes are 1 to 7, a MAC CE 2 carries information about secondary serving cells whose indexes are 8 to 14, and a MAC CE 3 carries states of secondary serving cells whose indexes are 15 to 21. If states of secondary serving cells whose cell indexes are 5 and 13 need to be changed, the last MAC CE of this type may be determined according to the largest value of the indexes of the cells whose states need to be changed, that is, the last MAC CE of this type, that is, the MAC CE 2, in the MAC PDU data packet is determined according to the cell index 13. That is, the MAC CE 3 does not need to be carried. Therefore, in this embodiment of the present invention, because it is determined that a MAC CE corresponding to a secondary serving cell whose group number is the largest in secondary serving cells whose activated/deactivated states need to be changed is a MAC CE at a rearmost location, that is, a MAC CE of a same type whose corresponding cell index is greater than the largest cell index does not need to be carried, signaling overheads can be reduced.

Optionally, in this embodiment of the present invention, when the first-type MAC CE is an extended power headroom report extended PHR MAC CE or a dual connectivity power headroom report dual connectivity PHR MAC CE, the first communications device determines that a MAC CE corresponding to a secondary serving cell whose cell index is the largest in secondary serving cells whose power headroom information needs to be reported is a MAC CE at a rearmost location in the at least one first-type MAC CE.

That is, when the base station generates the MAC PDU data packet, the base station may not need to add configured MAC CEs corresponding to all secondary serving cells to the MAC PDU data packet, but determine, according to whether power headroom information of a secondary serving cell needs to be reported and the largest cell index in indexes of secondary serving cells whose power headroom information needs to be reported, MAC CEs that need to be carried. The MAC PDU data packet does not need to carry such a MAC CE that the smallest index in secondary serving cells corresponding to the MAC CE is greater than the largest cell index in the indexes of the secondary serving cells whose power headroom information needs to be reported.

For example, it is assumed that 21 secondary serving cells are configured, each MAC CE of a particular type carries information about seven secondary serving cells in total, a MAC CE 1 carries information about secondary serving cells whose indexes are 1 to 7, a MAC CE 2 carries information about secondary serving cells whose indexes are 8 to 14, and a MAC CE 3 carries states of secondary serving cells whose indexes are 15 to 21. If power headroom information of secondary serving cells whose cell indexes are 5 and 13 needs to be reported, the last MAC CE of this type may be determined according to the largest value of the indexes of the cells whose power headroom information needs to be reported, that is, the last MAC CE of this type, that is, the MAC CE 2, in the MAC PDU data packet is determined according to the cell index 13. That is, the MAC CE 3 does not need to be carried. Therefore, in this embodiment of the present invention, because it is determined that a MAC CE corresponding to a secondary serving cell whose group number is the largest in secondary serving cells whose activated/deactivated states need to be changed is a MAC CE at a rearmost location, that is, a MAC CE of a same type whose corresponding cell index is greater than the largest cell index does not need to be carried, signaling overheads can be reduced.

Alternatively, the first communications device determines that a MAC CE corresponding to a secondary serving cell whose group number is the largest in secondary serving cells whose power control information needs to be reported is a MAC CE at a rearmost location in the at least one first-type MAC CE. For specific first-type MAC CEs to be carried and a sorting manner, refer to the foregoing descriptions.

Optionally, in this embodiment of the present invention, when the first-type MAC CE is an extended power headroom report extended PHR MAC CE, the first MAC CE in the at least one first-type MAC CE further includes power headroom information of a primary serving cell, and a first-type MAC CE after the first one of the at least one first-type MAC CE does not include the power headroom information of the primary serving cell, so as to avoid repeated information reporting and reduce signaling overheads.

In this case, a specific signaling structure of the first extended PHR MAC CE may be shown in FIG. 5a. In FIG. 5a, Ci is used to indicate whether corresponding power headroom information of a corresponding secondary serving cell has been reported. PH (Type2, PCell) indicates type-2 power headroom information of a primary serving cell. PH (Type1, PCell) indicates type-1 power headroom information of a primary serving cell. PH (Type1, SCell) indicates type-1 power headroom information of a secondary serving cell. R is a reserved field. $P_{CMAC}$, P, and V are other power information. Refer to the prior art, and details are not described herein again. A specific signaling structure of an extended PHR MAC CE after the first extended PHR MAC CE may be shown in FIG. 5b. In FIG. 5b, Ci is used to indicate whether corresponding power headroom information of a corresponding secondary serving cell has been reported. PH (Type1, SCell) indicates type-1 power headroom information of a secondary serving cell. PH (Type2, SCell) indicates type-2 power headroom information of a secondary serving cell. $P_{CMAC,c}$, P, and V are other power information. Refer to the prior art, and details are not described herein again.

Optionally, in this embodiment of the present invention, when the first-type MAC CE is a dual connectivity power headroom report dual connectivity PHR MAC CE, the first MAC CE in the at least one first-type MAC CE further includes power headroom information of a primary serving cell and power headroom information of a primary secondary serving cell, and a first-type MAC CE after the first one of the at least one first-type MAC CE includes neither the power headroom information of the primary serving cell nor the power headroom information of the primary secondary serving cell, so as to avoid repeated information reporting and reduce signaling overheads.

In this case, a signaling format of the first dual connectivity PHR MAC CE may be shown in FIG. 6a. In FIG. 6a, Ci is used to indicate whether corresponding power headroom information of a corresponding secondary serving cell has been reported. PH (Type2, PCell) indicates type-2 power headroom information of a primary serving cell. PH (Type1, PCell) indicates type-1 power headroom information of a primary serving cell. PH (Type1, SCell) indicates type-1 power headroom information of a secondary serving cell.

PH (Type2, PSCell) indicates type-2 power headroom information of a primary secondary serving cell. R is a reserved field. PCMAC, P, and V are other power information. Refer to the prior art, and details are not described herein again. A signaling format of a dual connectivity PHR MAC CE after the first dual connectivity PHR MAC CE may be shown in FIG. 6b. In FIG. 6b, Ci is used to indicate whether corresponding power headroom information of a corresponding secondary serving cell has been reported. PH (Type1, SCell) indicates type-1 power headroom information of a secondary serving cell. R is a reserved field. PCMAC, P, and V are other power information. Refer to the prior art, and details are not described herein again.

Optionally, in this embodiment of the present invention, when the first-type MAC CE indicates that power headroom information of a secondary serving cell is carried, and the secondary serving cell has a PUCCH, the first-type MAC CE further includes type-2 power headroom information of the secondary serving cell.

Therefore, in this embodiment of the present invention, when generating a MAC PDU data packet, a first communications device determines a location of a first-type MAC CE in the MAC PDU data packet according to a secondary serving cell corresponding to the first-type MAC CE, so that when parsing the MAC PDU data packet, a second communications device can determine, according to a location of each first-type MAC CE in the MAC PDU data packet, a secondary serving cell corresponding to each first-type MAC CE, to obtain information about the secondary serving cell. Therefore, when a quantity of cells that need to be aggregated increases, multiple first-type MAC CEs may be added to one MAC PDU data packet, the first-type MAC CEs respectively carry information about different secondary serving cells, and it is determined, based on a location of a MAC CE in MAC PDU data, secondary serving cells about which information is carried in the MAC CE. In this way, a format of the MAC CE does not need to be changed (for example, a change that is brought when a group number of the MAC CE is increased or a length of the MAC CE is increased) to support aggregation of more cells, so that a relatively slight change is made to a protocol, and implementation is easy.

The embodiments of the present invention further provide another communication method, so as to resolve a problem of increasing a quantity of to-be-aggregated cells or flexibly changing a quantity of be-aggregated cells while making no change to a signaling structure, that is, maintaining a structure of a MAC CE and a structure of a sub-header. The following describes a method 700 in FIG. 12 and a method 800 in FIG. 13.

As shown in FIG. 12, the method 700 includes the following steps:

710. A base station determines that a first secondary serving cell needs to be activated, where all secondary serving cells in a first secondary serving cell group to which the first secondary serving cell belongs are in a deactivated state.

720. The base station generates a first MAC PDU data packet, where the first MAC PDU data packet includes a first activation/deactivation MAC CE, the first activation/deactivation MAC CE includes indication information, and the indication information is used to instruct to activate the first secondary serving cell or used to instruct to activate the first secondary serving cell group.

730. The base station sends the first MAC PDU to user equipment by using a primary serving cell, so that the user equipment activates the first secondary serving cell or the first secondary serving cell group.

Optionally, the first activation/deactivation MAC CE is used to indicate activated/deactivated states of N secondary serving cells, where different secondary serving cells in the N secondary serving cells respectively belong to different secondary serving cell groups in N secondary serving cell groups.

That is, the first MAC CE includes indication information, that is, Ci (where a value of i ranges from 1 to N), used to indicate the activated/deactivated states of the N secondary serving cells, and different secondary serving cells in the N secondary serving cells belong to different secondary serving cell groups.

Optionally, when the first activation/deactivation MAC CE is used to indicate the activated/deactivated states of the N secondary serving cells, the determining, by a base station, that a first secondary serving cell needs to be activated includes: determining, by the base station according to a fact that a second secondary serving cell needs to be activated, that the first secondary serving cell needs to be activated, where the second secondary serving cell belongs to the first secondary serving cell group; and after the user equipment activates the first secondary serving cell, the method 700 further includes:

generating, by the base station, a second MAC PDU data packet, where the first MAC PDU data packet includes a second activation/deactivation MAC CE, the second activation/deactivation MAC CE corresponds to the first secondary serving cell group and is used to indicate an activated/deactivated state in the first secondary serving cell group, and the second secondary serving cell is in an activated state in the second activation/deactivation MAC CE; and sending, by the base station, the second MAC PDU to the user equipment by using the first secondary serving cell, so that the second user equipment activates the second secondary serving cell.

Specifically, at least one secondary serving cell in each group may be allocated one index that is included in a group to which the primary serving cell belongs. In this way, when all cells in a group are deactivated, a cell, in the group, having a cell index in the group to which the primary serving cell belongs may be activated by using the primary serving cell, and another cell in the group may further be activated by using the cell. Certainly, because the cell is also allocated an index in the group, activation/deactivation may also be performed by using a cell in the group. It should be understood that, the group to which the primary serving cell belongs mentioned in the present invention may be such a cell group that the group includes the primary serving cell and at least one secondary serving cell in each secondary serving cell group.

Optionally, the first activation/deactivation MAC CE is used to indicate activated/deactivated states of N secondary serving cell groups.

That is, the first MAC CE includes Ci (where a value of i ranges from 1 to N), used to indicate the activated/deactivated states of the N secondary serving cell groups. For example, C1 indicates that the first secondary serving cell group is in an activated state, so that all secondary serving cells in the first secondary serving cell group can be activated. For another example, C2 indicates that the second secondary serving cell group is in a deactivated state, so that all secondary serving cells in the second secondary serving cell group can be deactivated.

Specifically, each cell group is allocated one group number, and each cell group corresponds to one bit in a MAC CE. For a cell group, activation/deactivation is performed by using a MAC CE delivered by the primary serving cell. For a cell in a cell group corresponding to a secondary serving cell, activation/deactivation is performed by using a MAC CE delivered by the secondary serving cell.

Optionally, the base station may group secondary serving cells of the user equipment (where the grouping is performed by using Radio Resource Control RRC signaling). Each first-type MAC CE is used to carry information about a secondary serving cell in a secondary serving cell group. Bits in each MAC CE may be mapped to secondary serving cells in the following two manners.

1). Each secondary serving cell is allocated one intra-secondary serving cell group index, and Ci corresponds to a secondary serving cell whose intra-secondary serving cell group index is i.

2). Values of cell indexes of secondary serving cells respectively and sequentially correspond to Ci. For example, a secondary serving cell whose cell index is the smallest in cells in the secondary serving cell group corresponds to C1, a secondary serving cell whose cell index is immediately greater than the smallest cell index in the cells in the secondary serving cell group corresponds to C2, and so on.

Therefore, the foregoing method can resolve the following problem: A first-type MAC CE does not carry secondary serving cell group number information, a transmitter sends, in a cell in a secondary serving cell group corresponding to the MAC CE, the first-type MAC CE, and a receiver learns, according to a secondary serving cell that receives the MAC CE, that the first-type MAC CE corresponds to a secondary serving cell group to which the secondary serving cell belongs. However, when all cells in a cell group are deactivated, activation cannot be performed by sending, by using a secondary serving cell in the secondary serving cell group, the MAC CE.

Therefore, the foregoing embodiment can increase a quantity of to-be-aggregated cells or flexibly change a quantity of to-be-aggregated cells while making no change to a signaling structure, that is, maintaining a structure of a MAC CE and a structure of a sub-header.

Figure 13:
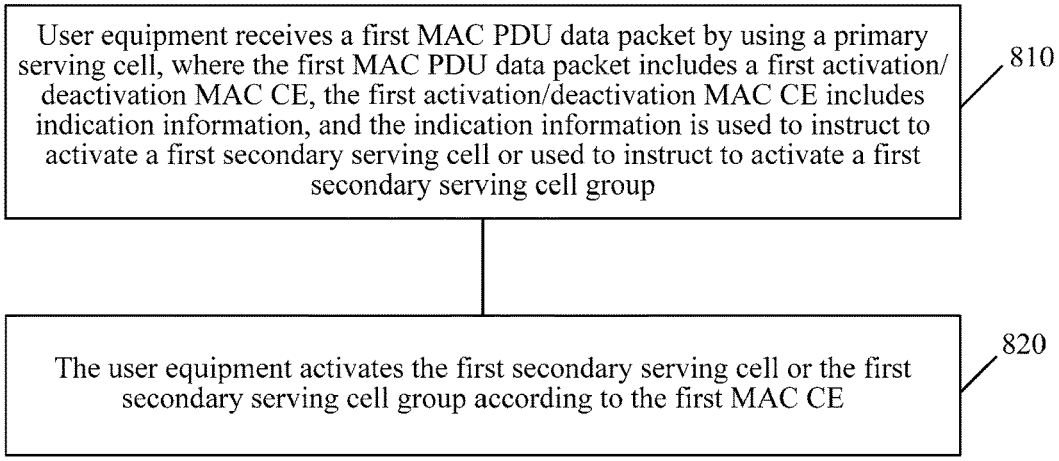
FIG. 13 is a schematic flowchart of a communication method according to another embodiment of the present invention.

As shown in FIG. 13, the method 800 includes the following steps:

810. User equipment receives a first MAC PDU data packet by using a primary serving cell, where the first MAC PDU data packet includes a first activation/deactivation MAC CE, the first activation/deactivation MAC CE includes indication information, and the indication information is used to instruct to activate a first secondary serving cell or used to instruct to activate a first secondary serving cell group.

820. The user equipment activates the first secondary serving cell or the first secondary serving cell group according to the first MAC CE.

Optionally, the first activation/deactivation MAC CE is used to indicate activated/deactivated states of N secondary serving cells, where different secondary serving cells in the N secondary serving cells respectively belong to different secondary serving cell groups in N secondary serving cell groups.

That is, the first MAC CE includes an indication, that is, Ci (where a value of i ranges from 1 to N), used to indicate the activated/deactivated states of the N secondary serving cells. Each secondary serving cell respectively belongs to one secondary serving cell group, and different secondary serving cells in the N secondary serving cells belong to different secondary serving cell groups.

Optionally, when the first activation/deactivation MAC CE is used to indicate the activated/deactivated states of the N secondary serving cells, after the activating the first secondary serving cell, the method 800 further includes:

receiving, by the user equipment, a second MAC PDU data packet by using the first secondary serving cell, where the second MAC PDU data packet includes a second activation/deactivation MAC CE, the second activation/deactivation MAC CE corresponds to the first secondary serving cell group and is used to indicate an activated/deactivated state in the first secondary serving cell group, the second secondary serving cell and the first secondary serving cell belong to the first secondary serving cell group, and the second secondary serving cell is in an activated state in the second activation/deactivation MAC CE; and activating, by the user equipment, the second cell according to the second MAC PDU data packet.

Specifically, at least one secondary serving cell in each group may be allocated one index that is included in a group to which the primary serving cell belongs. In this way, when all cells in a group are deactivated, a cell, in the group, having a cell index in the group to which the primary serving cell belongs may be activated by using the primary serving cell, and another cell in the group may further be activated by using the cell. Certainly, because the cell is also allocated an index in the group, activation/deactivation may also be performed by using a cell in the group.

Optionally, the first activation/deactivation MAC CE is used to indicate activated/deactivated states of N secondary serving cell groups.

That is, the first MAC CE includes Ci (where a value of i ranges from 1 to N), used to indicate the activated/deactivated states of the N secondary serving cell groups. For example, C1 indicates that the first secondary serving cell group is in an activated state, so that all secondary serving cells in the first secondary serving cell group can be activated. For another example, C2 indicates that the second secondary serving cell group is in a deactivated state, so that all secondary serving cells in the second secondary serving cell group can be deactivated.

Specifically, each cell group is allocated one group number, and each cell group corresponds to one bit in a MAC CE. For a cell group, activation/deactivation is performed by using a MAC CE delivered by the primary serving cell. For a cell in a cell group corresponding to a secondary serving cell, activation/deactivation is performed by using a MAC CE delivered by the secondary serving cell.

Optionally, the base station may group secondary serving cells of the user equipment (where the grouping is performed by using Radio Resource Control RRC signaling). Each first-type MAC CE is used to carry information about a secondary serving cell in a secondary serving cell group. Bits in each MAC CE may be mapped to secondary serving cells in the following two manners.

1). Each secondary serving cell is allocated one intra-secondary serving cell group index, and Ci corresponds to a secondary serving cell whose intra-secondary serving cell group index is i.

2). Values of cell indexes of secondary serving cells respectively and sequentially correspond to Ci. For example, a secondary serving cell whose cell index is the smallest in cells in the secondary serving cell group corresponds to C1, a secondary serving cell whose cell index is immediately greater than the smallest cell index in the secondary cells in the secondary serving cell group corresponds to C2, and so on.

Therefore, the foregoing method can resolve the following problem: A first-type MAC CE does not carry secondary serving cell group number information, a transmitter sends, in a cell in a cell group corresponding to the MAC CE, the first-type MAC CE, and a receiver learns, according to a cell that receives the MAC CE, that the first-type MAC CE corresponds to a cell group to which the cell belongs. However, when all cells in a cell group are deactivated, activation cannot be performed by sending, by using a cell in the cell group, the MAC CE.

Therefore, the foregoing embodiment can increase a quantity of to-be-aggregated cells or flexibly change a quantity of to-be-aggregated cells while making no change to a signaling structure, that is, maintaining a structure of a MAC CE and a structure of a sub-header.

FIG. 7 is a schematic flowchart of a communication method 200 according to an embodiment of the present invention. As shown in FIG. 7, the method 200 includes the following steps:

210. A second communications device obtains a MAC PDU data packet sent by a first communications device, where the MAC PDU data packet includes at least one first-type MAC control element CE, and each first-type MAC CE is used to carry information about at least one secondary serving cell.

220. The second communications device obtains the first-type MAC CE, and determines, according to a location of the first-type MAC CE in the MAC PDU data packet, a secondary serving cell corresponding to the first-type MAC CE, to obtain information about the secondary serving cell.

Specifically, when the first communications device determines that a MAC PDU data packet needs to be generated, the first communications device may determine secondary serving cells about which information needs to be carried in a MAC CE of a particular type in the MAC PDU data packet, and then determine, according to a secondary serving cell corresponding to each MAC CE of this type (where that a MAC CE corresponds to a secondary serving cell means that information about the secondary serving cell needs to be carried in the MAC CE), a location of each MAC CE of this type in the MAC PDU data packet. Then the first communications device encapsulates the MAC PDU data packet according to the location of each MAC CE of this type in the MAC PDU data packet, and sends the encapsulated MAC PDU data packet to the second communications device, so that after obtaining the MAC PDU data packet, the second communications device may determine, according to the location of each MAC CE of this type in the MAC PDU data packet, the secondary serving cell corresponding to each MAC CE of this type, to obtain information about the secondary serving cell.

Therefore, in this embodiment of the present invention, when generating a MAC PDU data packet, a first communications device determines a location of a first-type MAC CE in the MAC PDU data packet according to a secondary serving cell corresponding to the first-type MAC CE, so that when parsing the MAC PDU data packet, a second communications device can determine, according to a location of each first-type MAC CE in the MAC PDU data packet, a secondary serving cell corresponding to each first-type MAC CE, to obtain information about the secondary serving cell. Therefore, when a quantity of MAC CEs increases because a quantity of cells that need to be aggregated increases, it may be determined, based on a location of a MAC CE in MAC PDU data, secondary serving cells about which information is carried in the MAC CE. In this way, a format of the MAC CE does not need to be changed (for example, a change that is brought when a group number of the MAC CE is increased or a length of the MAC CE is increased), so that a relatively slight change is made to a protocol, and implementation is easy.

Optionally, this embodiment of the present invention may be used for intra-base station cell aggregation, or may be used for inter-base station cell aggregation.

Optionally, in this embodiment of the present invention, the first-type MAC CE may be an activation/deactivation MAC CE (Activation/Deactivation MAC CE), the first communications device is a base station, and the second communications device is user equipment. Alternatively, the first-type MAC CE is an extended PHR MAC CE or a dual connectivity PHR MAC CE, the first communications device is user equipment, and the second communications device is a base station.

Optionally, in this embodiment of the present invention, to support aggregation of more cells, a value range of a cell index is extended to greater than 7, for example, extended to 31.

Optionally, in this embodiment of the present invention, the MAC PDU data packet further includes at least one LCID, the at least one LCID is in a one-to-one correspondence with the at least one first-type MAC CE, and each of the at least one LCID is used to indicate that a respective corresponding MAC CE is a first-type MAC CE.

Optionally, in this embodiment of the present invention, each first-type MAC CE includes Ci, a value of i ranges from 1 to 7 (that is, each first-type MAC CE includes C1, C2, . . . , and C7), and if a first MAC CE in the at least one first-type MAC CE carries information about secondary serving cells whose corresponding cell indexes are $(X-1)*7+1$ to $(X-1)*7+7$, Ci in the first MAC CE corresponds to a secondary serving cell whose cell index is $(X-1)*7+i$.

Optionally, in this embodiment of the present invention, the determining, according to a location of the first-type MAC CE in the MAC PDU data packet, a secondary serving cell corresponding to the first-type MAC CE, to obtain information about the secondary serving cell includes:

determining, by the second communications device according to any one of the following, a secondary serving cell corresponding to each first-type MAC CE:

a location of each first-type MAC CE in first-type MAC CEs in the MAC PDU data packet, a location of each first-type MAC CE in MAC CEs in the MAC PDU data packet, or a location of each first-type MAC CE in MAC SDUs, MAC CEs, and padding units in the MAC PDU data packet.

That is, a MAC CE of a particular type corresponding to information about which secondary serving cells may be determined by a location of the MAC CE in all MAC CEs of this type, or may be determined by a location of the MAC CE in all MAC CEs, or may be determined by a location of the MAC CE in all MAC SDUs, MAC CEs, and padding units.

For ease of understanding, detailed descriptions are provided below with reference to two cases.

In the first case, secondary serving cells of user equipment are grouped by using Radio Resource Control RRC signaling, each cell group is allocated one group number, each first-type MAC CE is used to carry information about a secondary serving cell in a cell group, and the determining, according to a location of the first-type MAC CE in the MAC PDU data packet, a secondary serving cell corresponding to the first-type MAC CE, to obtain information about the secondary serving cell includes:

if a location of a first MAC CE in the at least one first-type MAC CE is the $X^{th}$ first-type MAC CE in the MAC PDU data packet, determining that the first MAC CE carries information about a secondary serving cell whose corresponding group number is X; or if a location of a first MAC CE in the at least one first-type MAC CE is the $X^{th}$ MAC CE in the MAC PDU data packet, determining that the first MAC CE carries information about a secondary serving cell whose corresponding group number is X; or if a location of a first MAC CE in the at least one first-type MAC CE is the $X^{th}$ unit in the MAC SDUs, the MAC CEs, and the padding units in the MAC PDU data packet, determining that the first MAC CE carries information about a secondary serving cell whose corresponding group number is X.

Specifically, the base station may group the secondary serving cells of the user equipment by using the RRC signaling. Each first-type MAC CE is used to carry information about a secondary serving cell in a cell group. Bits in each MAC CE may be mapped to secondary serving cells in the following two manners.

1). Each cell is allocated one intra-cell group index, and Ci corresponds to a secondary serving cell whose intra-cell group index is i.

2). Values of cell indexes of secondary serving cells respectively and sequentially correspond to Ci. For example, a secondary serving cell whose cell index is the smallest in cells in the cell group corresponds to C1, a secondary serving cell whose cell index is immediately greater than the smallest cell index in the cells in the cell group corresponds to C2, and so on.

For ease of understanding, detailed descriptions are provided below with reference to FIG. 3a and FIG. 3b. In the descriptions provided with reference to FIG. 3a and FIG. 3b, it is assumed herein that a MAC PDU data packet carries a maximum of five groups of secondary serving cells, one group of secondary serving cells includes seven secondary serving cells, and each group of secondary serving cells is mapped to one MAC CE.

If a MAC CE of a particular type corresponding to information about which secondary serving cells may be determined by a location of the MAC CE in all MAC CEs of this type in the MAC PDU data packet, and it is assumed in FIG. 3a that a MAC CE 1 and a MAC CE 2 are first-type MAC CEs, the MAC CE 1 carries information about a secondary serving cell whose group number is 1, and the MAC CE 2 carries information about a secondary serving cell whose group number is 2.

If a MAC CE of a particular type corresponding to information about which secondary serving cells may be determined by a location of the MAC CE in all MAC CEs in the MAC PDU data packet, and it is assumed in FIG. 3a that a MAC CE 2 and a MAC CE 4 are first-type MAC CEs, the MAC CE 2 carries information about a secondary serving cell whose group number is 2, and the MAC CE 4 carries information about a secondary serving cell whose group number is 4.

Figure 3B:
FIG. 3b is a format diagram of an applicable MAC PDU data packet according to another embodiment of the present invention.

If a MAC CE of a particular type corresponding to information about which secondary serving cells may be determined by a location of the MAC CE in all MAC SDUs, MAC CEs, and padding units in the MAC PDU data packet, and in FIG. 3b, a MAC CE 1 and a MAC CE 3 are first-type MAC CEs, the MAC CE 1 carries information about a secondary serving cell whose group number is 2, and the MAC CE 3 carries information about a secondary serving cell whose group number is 4.

In the second case, the determining, according to a location of the first-type MAC CE in the MAC PDU data packet, a secondary serving cell corresponding to the first-type MAC CE, to obtain information about the secondary serving cell may include:

if a first MAC CE in the at least one first-type MAC CE is the $X^{th}$ first-type MAC CE in the MAC PDU data packet, determining that the first MAC CE corresponds to secondary serving cells whose cell indexes are $(X-1)*N+1$ to $(X-1)*N+N$, that is, determining that the $X^{th}$ first-type MAC CE in the MAC PDU data packet carries information about the secondary serving cells whose corresponding cell indexes are $(X-1)*N+1$ to $(X-1)*N+N$, where preferably, if the MAC PDU data packet carries multiple first-type MAC CEs, the multiple first-type MAC CEs are consecutively stored; or if a location of a first MAC CE in the at least one first-type MAC CE is the $X^{th}$ MAC CE in the MAC PDU data packet, determining that the first MAC CE corresponds to secondary serving cells whose cell indexes are $(X-1)*N+1$ to $(X-1)*N+N$, that is, determining that the $X^{th}$ MAC CE in the MAC PDU data packet carries information about the secondary serving cells whose corresponding cell indexes are $(X-1)*N+1$ to $(X-1)*N+N$; or if a location of a first MAC CE in the at least one first-type MAC CE is the $X^{th}$ unit in all the MAC SDUs, MAC CEs, and padding units in the MAC PDU data packet, determining that the first MAC CE corresponds to secondary serving cells whose cell indexes are $(X-1)*N+1$ to $(X-1)*N+N$, that is, determining that the $X^{th}$ unit in all the MAC SDUs, MAC CEs, and padding units in the MAC PDU data packet carries information about secondary serving cells whose corresponding cell indexes are $(X-1)*N+1$ to $(X-1)*N+N$.

For ease of understanding, detailed descriptions are provided below with reference to FIG. 3a and FIG. 3b. In the descriptions provided with reference to FIG. 3a and FIG. 3b, it is assumed herein that one MAC CE supports seven secondary serving cells, a MAC PDU data packet supports a maximum of 31 secondary serving cells, and cell indexes (index) are 1 to 31.

If a MAC CE of a particular type corresponding to information about which secondary serving cells may be determined by a location of the MAC CE in all MAC CEs of this type in the MAC PDU data packet, and it is assumed in FIG. 3a that a MAC CE 1 and a MAC CE 2 are first-type MAC CEs, the MAC CE 1 carries information about secondary serving cells whose cell indexes are 1 to 7, and the MAC CE 2 carries information about secondary serving cells whose cell indexes are 8 to 14.

If a MAC CE of a particular type corresponding to information about which secondary serving cells may be determined by a location of the MAC CE in all MAC CEs in the MAC PDU data packet, and it is assumed in FIG. 3a that a MAC CE 2 and a MAC CE 4 are first-type MAC CEs, the MAC CE 2 carries information about secondary serving cells whose cell indexes are 8 to 14, and the MAC CE 4 carries information about secondary serving cells whose cell indexes are 22 to 28.

If a MAC CE of a particular type corresponding to information about which secondary serving cells may be determined by a location of the MAC CE in all MAC SDUs, MAC CEs, and padding units in the MAC PDU data packet, and it is assumed in FIG. 3b that, a MAC CE 1 and a MAC CE 3 are first-type MAC CEs, the MAC CE 1 carries information about secondary serving cells whose cell indexes are 8 to 14, and the MAC CE 3 carries information about secondary serving cells whose cell indexes are 22 to 28.

Optionally, in this embodiment of the present invention, when the first-type MAC CE is an extended PHR MAC CE, the first MAC CE in the at least one first-type MAC CE further includes power headroom information of a primary serving cell, a first-type MAC CE after the first one of the at least one first-type MAC CE does not include the power headroom information of the primary serving cell, and the second communications device obtains the power headroom information of the primary serving cell from the first MAC CE. In this case, a specific signaling structure of the first extended PHR MAC CE may be shown in FIG. 5a. A specific signaling structure of an extended PHR MAC CE after the first extended PHR MAC CE may be shown in FIG. 5b.

Optionally, in this embodiment of the present invention, when the first-type MAC CE is a dual connectivity PHR MAC CE, the first MAC CE in the at least one first-type MAC CE further includes power headroom information of a primary serving cell and power headroom information of a primary secondary serving cell, a first-type MAC CE after the first one of the at least one first-type MAC CE includes neither the power headroom information of the primary serving cell nor the power headroom information of the primary secondary serving cell, and the method 200 further includes: obtaining, by the second communications device, the power headroom information of the primary serving cell and the power headroom information of the primary secondary serving cell from the first MAC CE. In this case, a signaling format of the first dual connectivity PHR MAC CE may be shown in FIG. 6a. A signaling format of a dual connectivity PHR MAC CE after the first dual connectivity PHR MAC CE may be shown in FIG. 6b.

Optionally, in this embodiment of the present invention, when power headroom information of a secondary serving cell indicated by the first-type MAC CE is carried, and the secondary serving cell has a PUCCH, the first-type MAC CE further includes type-2 information of the secondary serving cell. The second communications device may further obtain the type-2 information of the secondary serving cell according to the first-type MAC CE.

Therefore, in this embodiment of the present invention, when generating a MAC PDU data packet, a first communications device determines a location of a first-type MAC CE in the MAC PDU data packet according to a secondary serving cell corresponding to the first-type MAC CE, so that when parsing the MAC PDU data packet, a second communications device can determine, according to a location of each first-type MAC CE in the MAC PDU data packet, a secondary serving cell corresponding to each first-type MAC CE, to obtain information about the secondary serving cell. Therefore, when a quantity of cells that need to be aggregated increases, multiple first-type MAC CEs may be added to one MAC PDU data packet, the first-type MAC CEs respectively carry information about different secondary serving cells, and it is determined, based on a location of a MAC CE in MAC PDU data, secondary serving cells about which information is carried in the MAC CE. In this way, a format of the MAC CE does not need to be changed (for example, a change that is brought when a group number of the MAC CE is increased or a length of the MAC CE is increased) to support aggregation of more cells, so that a relatively slight change is made to a protocol, and implementation is easy.

Figure 8:
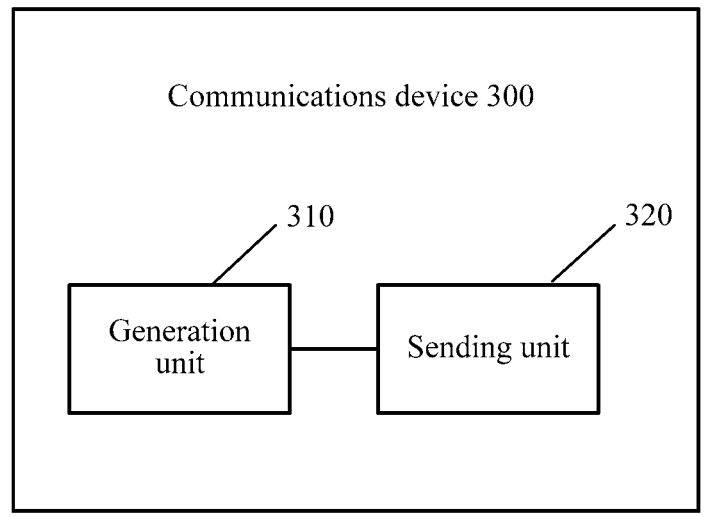
FIG. 8 is a schematic block diagram of a communications device according to another embodiment of the present invention.

FIG. 8 is a schematic block diagram of a communications device 300 according to an embodiment of the present invention. As shown in FIG. 8, the communications device 300 includes:

a generation unit 310, configured to generate a MAC PDU data packet, where the MAC PDU data packet includes at least one first-type MAC control element CE, each first-type MAC CE is used to carry information about at least one secondary serving cell, and the generation unit 310 determines a location of the first-type MAC CE in the MAC PDU data packet according to a secondary serving cell corresponding to the first-type MAC CE; and a sending unit 320, configured to send the MAC PDU data packet generated by the generation unit 310 to a second communications device, so that the second communications device obtains the first-type MAC CE, and determines, according to the location of the first-type MAC CE in the MAC PDU data packet, the secondary serving cell corresponding to the first-type MAC CE, to obtain information about the secondary serving cell.

Specifically, when the communications device 300 determines that a MAC PDU data packet needs to be generated, the communications device 300 may determine secondary serving cells about which information needs to be carried in a MAC CE of a particular type in the MAC PDU data packet, and then determine, according to a secondary serving cell corresponding to each MAC CE of this type (where that a MAC CE corresponds to a secondary serving cell means that information about the secondary serving cell needs to be carried in the MAC CE), a location of each MAC CE of this type in the MAC PDU data packet. Then the communications device 300 encapsulates the MAC PDU data packet according to the location of each MAC CE of this type in the MAC PDU data packet, and sends the encapsulated MAC PDU data packet to the second communications device, so that after obtaining the MAC PDU data packet, the second communications device may determine, according to the location of each MAC CE of this type in the MAC PDU data packet, the secondary serving cell corresponding to each MAC CE of this type, to obtain information about the secondary serving cell.

Optionally, the generation unit 310 is specifically configured to:

determine a location of each first-type MAC CE in first-type MAC CEs in the MAC PDU data packet according to the secondary serving cell corresponding to the first-type MAC CE, or a location of each first-type MAC CE in MAC CEs in the MAC PDU data packet, or a location of each first-type MAC CE in MAC SDUs, MAC CEs, and padding units in the MAC PDU data packet.

Optionally, each first-type MAC CE is used to carry information about N secondary serving cells, and the generation unit 310 is specifically configured to:

if a first MAC CE in the at least one first-type MAC CE carries information about secondary serving cells whose corresponding cell indexes are $(X-1)*N+1$ to $(X-1)*N+N$, determine that the first MAC CE is the $X^{th}$ first-type MAC CE in the MAC PDU data packet; or if a first MAC CE in the at least one first-type MAC CE carries information about secondary serving cells whose corresponding cell indexes are $(X-1)*N+1$ to $(X-1)*N+N$, determine that the first MAC CE is the $X^{th}$ MAC CE in the MAC PDU data packet; or if a first MAC CE in the at least one first-type MAC CE carries information about secondary serving cells whose corresponding cell indexes are $(X-1)*N+1$ to $(X-1)*N+N$, determine that the first MAC CE is the $X^{th}$ unit in the MAC SDUs, the MAC CEs, and the padding units in the MAC PDU data packet.

Optionally, in this embodiment of the present invention, secondary serving cells of user equipment are grouped by using Radio Resource Control RRC signaling, each first-type MAC CE is used to carry information about a secondary serving cell in a cell group, and the generation unit 310 is specifically configured to:

if a first MAC CE in the at least one first-type MAC CE carries information about a secondary serving cell whose corresponding group number is X, determine that the first MAC CE is the $X^{th}$ first-type MAC CE in the MAC PDU data packet; or if a first MAC CE in the at least one first-type MAC CE carries information about a secondary serving cell whose corresponding group number is X, determine that the first MAC CE is the $X^{th}$ MAC CE in the MAC PDU data packet; or if a first MAC CE in the at least one first-type MAC CE carries information about a secondary serving cell whose corresponding group number is X, determine that the first MAC CE is the $X^{th}$ unit in the MAC service data units SDUs, the MAC CEs, and the padding units in the MAC PDU data packet.

Optionally, in this embodiment of the present invention, the MAC PDU data packet further includes at least one LCID, the at least one LCID is in a one-to-one correspondence with the at least one first-type MAC CE, and each of the at least one LCID is used to indicate that a respective corresponding MAC CE is a first-type MAC CE.

Optionally, in this embodiment of the present invention, each first-type MAC CE includes Ci, a value of i ranges from 1 to 7, and if the first MAC CE in the at least one first-type MAC CE carries information about secondary serving cells whose corresponding cell indexes are $(X-1)*7+1$ to $(X-1)*7+7$, Ci in the first MAC CE corresponds to a secondary serving cell whose cell index is $(X-1)*7+i$.

Optionally, in this embodiment of the present invention, the first-type MAC CE is an activation/deactivation MAC CE, the communications device 300 is a base station, and the second communications device is user equipment.

Optionally, when the first-type MAC CE is an activation/deactivation MAC CE, the generation unit 310 is specifically configured to:

determine that a MAC CE corresponding to a secondary serving cell whose cell index is the largest in secondary serving cells whose activated/deactivated states need to be changed is a MAC CE at a rearmost location in the at least one first-type MAC CE; or determine that a MAC CE corresponding to a secondary serving cell whose group number is the largest in secondary serving cells whose activated/deactivated states need to be changed is a MAC CE at a rearmost location in the at least one first-type MAC CE.

Optionally, the first-type MAC CE is an extended power headroom report extended PHR MAC CE or a dual connectivity power headroom report dual connectivity PHR MAC CE, the communications device is user equipment, and the second communications device is a base station.

Optionally, when the first-type MAC CE is an extended power headroom report extended PHR MAC CE or a dual connectivity power headroom report dual connectivity PHR MAC CE, the generation unit 310 is specifically configured to:

determine that a MAC CE corresponding to a secondary serving cell whose cell index is the largest in secondary serving cells whose power headroom information needs to be reported is a MAC CE at a rearmost location in the at least one first-type MAC CE; or determine that a MAC CE corresponding to a secondary serving cell whose group number is the largest in secondary serving cells whose power headroom information needs to be reported is a MAC CE at a rearmost location in the at least one first-type MAC CE.

Optionally, when the first-type MAC CE is an extended power headroom report extended PHR MAC CE, the first MAC CE in the at least one first-type MAC CE further includes power headroom information of a primary serving cell, and a first-type MAC CE after the first one of the at least one first-type MAC CE does not include the power headroom information of the primary serving cell; or when the first-type MAC CE is a dual connectivity PHR MAC CE, the first MAC CE in the at least one first-type MAC CE further includes power headroom information of a primary serving cell and power headroom information of a primary secondary serving cell, and a first-type MAC CE after the first one of the at least one first-type MAC CE includes neither the power headroom information of the primary serving cell nor the power headroom information of the primary secondary serving cell.

Optionally, when the first-type MAC CE is an extended power headroom report extended PHR MAC CE or a dual connectivity power headroom report dual connectivity PHR MAC CE, when the first-type MAC CE indicates that power headroom information of a secondary serving cell is carried, and the secondary serving cell has a PUCCH, the first-type MAC CE further includes type-2 information of the secondary serving cell.

It should be understood that, the communications device 300 in this embodiment of the present invention may correspond to the first communications device in the foregoing communication methods 100 and 200, and can implement a function of the first communications device. For brevity, details are not described herein again.

Therefore, in this embodiment of the present invention, when generating a MAC PDU data packet, the communications device 300 determines a location of a first-type MAC CE in the MAC PDU data packet according to a secondary serving cell corresponding to the first-type MAC CE, so that when parsing the MAC PDU data packet, a second communications device can determine, according to a location of each first-type MAC CE in the MAC PDU data packet, a secondary serving cell corresponding to each first-type MAC CE, to obtain information about the secondary serving cell. Therefore, when a quantity of cells that need to be aggregated increases, multiple first-type MAC CEs may be added to one MAC PDU data packet, the first-type MAC CEs respectively carry information about different secondary serving cells, and it is determined, based on a location of a MAC CE in MAC PDU data, secondary serving cells about which information is carried in the MAC CE. In this way, a format of the MAC CE does not need to be changed (for example, a change that is brought when a group number of the MAC CE is increased or a length of the MAC CE is increased) to support aggregation of more cells, so that a relatively slight change is made to a protocol, and implementation is easy.

Figure 9:
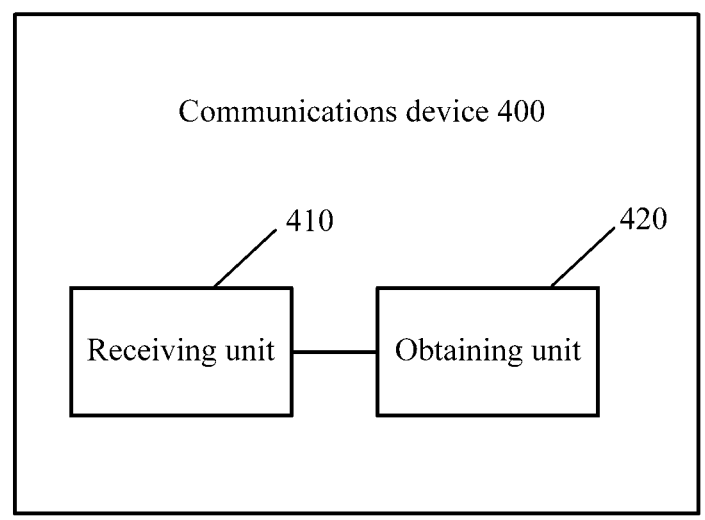
FIG. 9 is a schematic block diagram of a communications device according to another embodiment of the present invention.

FIG. 9 is a schematic block diagram of a communications device 400 according to an embodiment of the present invention. As shown in FIG. 9, the communications device 400 includes:

a receiving unit 410, configured to receive a MAC PDU data packet sent by a first communications device, where the MAC PDU data packet includes at least one first-type MAC control element CE, and each first-type MAC CE is used to carry information about at least one secondary serving cell; and an obtaining unit 420, configured to: obtain the first-type MAC CE from the MAC PDU data packet, and determine, according to a location of the first-type MAC CE in the MAC PDU data packet, a secondary serving cell corresponding to the first-type MAC CE, to obtain information about the secondary serving cell.

Optionally, the obtaining unit 420 is specifically configured to:

determine, according to any one of the following, a secondary serving cell corresponding to each first-type MAC CE:

a location of each first-type MAC CE in first-type MAC CEs in the MAC PDU data packet, a location of each first-type MAC CE in MAC CEs in the MAC PDU data packet, or a location of each first-type MAC CE in MAC SDUs, MAC CEs, and padding units in the MAC PDU data packet.

Optionally, the obtaining unit 420 is specifically configured to:

if a first MAC CE in the at least one first-type MAC CE is the $X^{th}$ first-type MAC CE in the MAC PDU data packet, determine that the first MAC CE corresponds to secondary serving cells whose cell indexes are $(X-1)*N+1$ to $(X-1)*N+N$; or if a location of a first MAC CE in the at least one first-type MAC CE is the $X^{th}$ MAC CE in the MAC PDU data packet, determine that the first MAC CE corresponds to secondary serving cells whose cell indexes are $(X-1)*N+1$ to $(X-1)*N+N$; or if a location of a first MAC CE in the at least one first-type MAC CE is the $X^{th}$ unit in the MAC SDUs, the MAC CEs, and the padding units in the MAC PDU data packet, determine that the first MAC CE corresponds to secondary serving cells whose cell indexes are $(X-1)*N+1$ to $(X-1)*N+N$.

Optionally, secondary serving cells of user equipment are grouped by using Radio Resource Control RRC signaling, each first-type MAC CE is used to carry information about a secondary serving cell in a cell group, and the obtaining unit 420 is specifically configured to:

if a location of a first MAC CE in the at least one first-type MAC CE is the $X^{th}$ first-type MAC CE in the MAC PDU data packet, determine that the first MAC CE carries information about a secondary serving cell whose corresponding group number is X; or if a location of a first MAC CE in the at least one first-type MAC CE is the $X^{th}$ MAC CE in the MAC PDU data packet, determine that the first MAC CE carries information about a secondary serving cell whose corresponding group number is X; or if a location of a first MAC CE in the at least one first-type MAC CE is the $X^{th}$ unit in the MAC SDUs, the MAC CEs, and the padding units in the MAC PDU data packet, determine that the first MAC CE carries information about a secondary serving cell whose corresponding group number is X.

Optionally, the MAC PDU data packet further includes at least one LCID, the at least one LCID is in a one-to-one correspondence with the at least one first-type MAC CE, and each of the at least one LCID is used to indicate that a respective corresponding MAC CE is a first-type MAC CE.

Optionally, each first-type MAC CE includes Ci, a value of i ranges from 1 to 7, and if the first MAC CE in the at least one first-type MAC CE carries information about secondary serving cells whose corresponding cell indexes are $(X-1)*7+1$ to $(X-1)*7+7$, Ci in the first MAC CE corresponds to a secondary serving cell whose cell index is $(X-1)*7+i$.

Optionally, the first-type MAC CE is an activation/deactivation MAC CE, the first communications device is a base station, and the communications device 400 is user equipment.

Optionally, the first-type MAC CE is an extended power headroom report extended PHR MAC CE or a dual connectivity power headroom report dual connectivity PHR MAC CE, the first communications device is user equipment, and the communications device 400 is a base station.

Optionally, when the first-type MAC CE is an extended PHR MAC CE, the first MAC CE in the at least one first-type MAC CE further includes power headroom information of a primary serving cell, a first-type MAC CE after the first one of the at least one first-type MAC CE does not include the power headroom information of the primary serving cell, and the obtaining unit 420 is further configured to obtain the power headroom information of the primary serving cell from the first MAC CE; or when the first-type MAC CE is a dual connectivity PHR MAC CE, the first MAC CE in the at least one first-type MAC CE further includes power headroom information of a primary serving cell and power headroom information of a primary secondary serving cell, a first-type MAC CE after the first one of the at least one first-type MAC CE includes neither the power headroom information of the primary serving cell nor the power headroom information of the primary secondary serving cell, and the obtaining further includes: obtaining the power headroom information of the primary serving cell and the power headroom information of the primary secondary serving cell from the first MAC CE.

Optionally, when power headroom information of a secondary serving cell indicated by the first-type MAC CE is carried, and the secondary serving cell has a PUCCH, the first-type MAC CE further includes type-2 information of the secondary serving cell; and the obtaining unit 420 is further configured to:

obtain the type-2 information of the secondary serving cell according to the first-type MAC CE.

It should be understood that, the communications device 400 in this embodiment of the present invention may correspond to the second communications device in the foregoing communication methods 100 and 200, and can implement a function of the second communications device. For brevity, details are not described herein again.

Therefore, in this embodiment of the present invention, when generating a MAC PDU data packet, a first communications device determines a location of a first-type MAC CE in the MAC PDU data packet according to a secondary serving cell corresponding to the first-type MAC CE, so that when parsing the MAC PDU data packet, the communications device 400 can determine, according to a location of each first-type MAC CE in the MAC PDU data packet, a secondary serving cell corresponding to each first-type MAC CE, to obtain information about the secondary serving cell. Therefore, when a quantity of cells that need to be aggregated increases, multiple first-type MAC CEs may be added to one MAC PDU data packet, the first-type MAC CEs respectively carry information about different secondary serving cells, and it is determined, based on a location of a MAC CE in MAC PDU data, secondary serving cells about which information is carried in the MAC CE. In this way, a format of the MAC CE does not need to be changed (for example, a change that is brought when a group number of the MAC CE is increased or a length of the MAC CE is increased) to support aggregation of more cells, so that a relatively slight change is made to a protocol, and implementation is easy.

Figure 10:
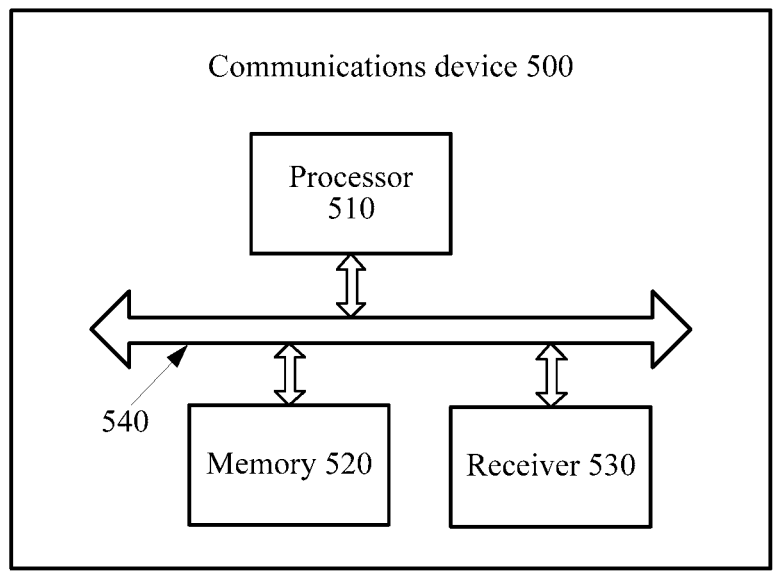
FIG. 10 is a schematic block diagram of a communications device according to another embodiment of the present invention.

FIG. 10 is a schematic block diagram of a communications device 500 according to an embodiment of the present invention. As shown in FIG. 10, the communications device 500 includes a processor 510, a memory 520, a transmitter 530, and a bus 540. The processor 510, the memory 520, and the transmitter 530 are connected to each other by using the bus 540. The memory 520 is configured to store program code. The processor 510 invokes the program code in the memory 520, to perform the following operations:

generating a MAC PDU data packet, where the MAC PDU data packet includes at least one first-type MAC control element CE, each first-type MAC CE is used to carry information about at least one secondary serving cell, and the communications device 500 determines a location of the first-type MAC CE in the MAC PDU data packet according to a secondary serving cell corresponding to the first-type MAC CE; and sending the MAC PDU data packet to a second communications device by using the transmitter 530, so that the second communications device obtains the first-type MAC CE, and determines, according to the location of the first-type MAC CE in the MAC PDU data packet, the secondary serving cell corresponding to the first-type MAC CE, to obtain information about the secondary serving cell.

Specifically, when the communications device 500 determines that a MAC PDU data packet needs to be generated, the communications device 500 may determine secondary serving cells about which information needs to be carried in a MAC CE of a particular type in the MAC PDU data packet, and then determine, according to a secondary serving cell corresponding to each MAC CE of this type (where that a MAC CE corresponds to a secondary serving cell means that information about the secondary serving cell needs to be carried in the MAC CE), a location of each MAC CE of this type in the MAC PDU data packet. Then the communications device 500 encapsulates the MAC PDU data packet according to the location of each MAC CE of this type in the MAC PDU data packet, and sends the encapsulated MAC PDU data packet to the second communications device, so that after obtaining the MAC PDU data packet, the second communications device may determine, according to the location of each MAC CE of this type in the MAC PDU data packet, the secondary serving cell corresponding to each MAC CE of this type, to obtain information about the secondary serving cell.

Optionally, the processor 510 invokes the program code in the memory 520, to specifically perform the following operations:

determining a location of each first-type MAC CE in first-type MAC CEs in the MAC PDU data packet according to the secondary serving cell corresponding to the first-type MAC CE, or a location of each first-type MAC CE in MAC CEs in the MAC PDU data packet, or a location of each first-type MAC CE in MAC SDUs, MAC CEs, and padding units in the MAC PDU data packet.

Optionally, each first-type MAC CE is used to carry information about N secondary serving cells, and the processor 510 invokes the program code in the memory 520, to specifically perform the following operations:

if a first MAC CE in the at least one first-type MAC CE carries information about secondary serving cells whose corresponding cell indexes are $(X-1)*N+1$ to $(X-1)*N+N$, determining that the first MAC CE is the $X^{th}$ first-type MAC CE in the MAC PDU data packet; or if a first MAC CE in the at least one first-type MAC CE carries information about secondary serving cells whose corresponding cell indexes are $(X-1)*N+1$ to $(X-1)*N+N$, determining that the first MAC CE is the $X^{th}$ MAC CE in the MAC PDU data packet; or if a first MAC CE in the at least one first-type MAC CE carries information about secondary serving cells whose corresponding cell indexes are $(X-1)*N+1$ to $(X-1)*N+N$, determining that the first MAC CE is the $X^{th}$ unit in the MAC SDUs, the MAC CEs, and the padding units in the MAC PDU data packet.

Optionally, secondary serving cells of user equipment are grouped by using Radio Resource Control RRC signaling, each first-type MAC CE is used to carry information about a secondary serving cell in a cell group, and the processor 510 invokes the program code in the memory 520, to specifically perform the following operations:

if a first MAC CE in the at least one first-type MAC CE carries information about a secondary serving cell whose corresponding group number is X, determining that the first MAC CE is the $X^{th}$ first-type MAC CE in the MAC PDU data packet; or if a first MAC CE in the at least one first-type MAC CE carries information about a secondary serving cell whose corresponding group number is X, determining that the first MAC CE is the $X^{th}$ MAC CE in the MAC PDU data packet; or if a first MAC CE in the at least one first-type MAC CE carries information about a secondary serving cell whose corresponding group number is X, determining that the first MAC CE is the $X^{th}$ unit in the MAC service data units SDUs, the MAC CEs, and the padding units in the MAC PDU data packet.

Optionally, the MAC PDU data packet further includes at least one LCID, the at least one LCID is in a one-to-one correspondence with the at least one first-type MAC CE, and each of the at least one LCID is used to indicate that a respective corresponding MAC CE is a first-type MAC CE.

Optionally, each first-type MAC CE includes Ci, a value of i ranges from 1 to 7, and if the first MAC CE in the at least one first-type MAC CE carries information about secondary serving cells whose corresponding cell indexes are $(X-1)*7+1$ to $(X-1)*7+7$, Ci in the first MAC CE corresponds to a secondary serving cell whose cell index is $(X-1)*7+i$.

Optionally, the first-type MAC CE is an activation/deactivation MAC CE, the communications device 500 is a base station, and the second communications device is user equipment.

Optionally, the processor 510 invokes the program code in the memory 520, to specifically perform the following operations:

determining that a MAC CE corresponding to a secondary serving cell whose cell index is the largest in secondary serving cells whose activated/deactivated states need to be changed is a MAC CE at a rearmost location in the at least one first-type MAC CE; or determining that a MAC CE corresponding to a secondary serving cell whose group number is the largest in secondary serving cells whose activated/deactivated states need to be changed is a MAC CE at a rearmost location in the at least one first-type MAC CE.

Optionally, the first-type MAC CE is an extended PHR MAC CE or a dual connectivity PHR MAC CE, the communications device 500 is user equipment, and the second communications device is a base station.

Optionally, the processor 510 invokes the program code in the memory 520, to specifically perform the following operations:

determining that a MAC CE corresponding to a secondary serving cell whose cell index is the largest in secondary serving cells whose power headroom information needs to be reported is a MAC CE at a rearmost location in the at least one first-type MAC CE; or determining that a MAC CE corresponding to a secondary serving cell whose group number is the largest in secondary serving cells whose power headroom information needs to be reported is a MAC CE at a rearmost location in the at least one first-type MAC CE.

Optionally, when the first-type MAC CE is an extended PHR MAC CE, the first MAC CE in the at least one first-type MAC CE further includes power headroom information of a primary serving cell, and a first-type MAC CE after the first one of the at least one first-type MAC CE does not include the power headroom information of the primary serving cell; or when the first-type MAC CE is a dual connectivity PHR MAC CE, the first MAC CE in the at least one first-type MAC CE further includes power headroom information of a primary serving cell and power headroom information of a primary secondary serving cell, and a first-type MAC CE after the first one of the at least one first-type MAC CE includes neither the power headroom information of the primary serving cell nor the power headroom information of the primary secondary serving cell.

Optionally, when the first-type MAC CE indicates that power headroom information of a secondary serving cell is carried, and the secondary serving cell has a PUCCH, the first-type MAC CE further includes type-2 information of the secondary serving cell.

It should be understood that, the communications device 500 in this embodiment of the present invention may correspond to the first communications device in the foregoing communication methods 100 and 200, and can implement a function of the first communications device. For brevity, details are not described herein again.

Therefore, in this embodiment of the present invention, when generating a MAC PDU data packet, a first communications device determines a location of a first-type MAC CE in the MAC PDU data packet according to a secondary serving cell corresponding to the first-type MAC CE, so that when parsing the MAC PDU data packet, a communications device 500 can determine, according to a location of each first-type MAC CE in the MAC PDU data packet, a secondary serving cell corresponding to each first-type MAC CE, to obtain information about the secondary serving cell. Therefore, when a quantity of cells that need to be aggregated increases, multiple first-type MAC CEs may be added to one MAC PDU data packet, the first-type MAC CEs respectively carry information about different secondary serving cells, and it is determined, based on a location of a MAC CE in MAC PDU data, secondary serving cells about which information is carried in the MAC CE. In this way, a format of the MAC CE does not need to be changed (for example, a change that is brought when a group number of the MAC CE is increased or a length of the MAC CE is increased) to support aggregation of more cells, so that a relatively slight change is made to a protocol, and implementation is easy.

Figure 11:
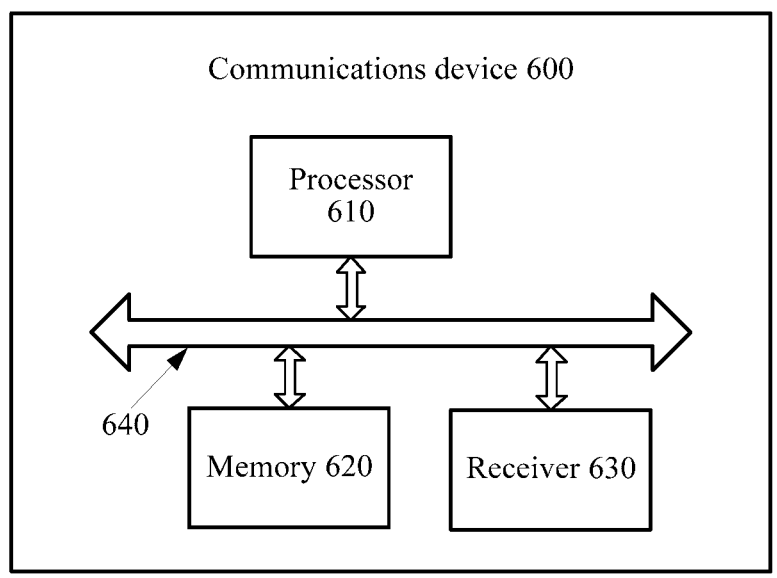
FIG. 11 is a schematic block diagram of a communications device according to another embodiment of the present invention.

FIG. 11 is a schematic block diagram of a communications device 600 according to an embodiment of the present invention. As shown in FIG. 11, the communications device 600 includes a processor 610, a memory 620, a receiver 630, and a bus 640. The processor 610, the memory 620, and the receiver 630 are connected to each other by using the bus 640. The memory 620 is configured to store program code.

The processor 610 invokes the program code in the memory 620, to perform the following operations:

receiving, by using the receiver 630, a Media Access Control MAC protocol data unit PDU data packet sent by a first communications device, where the MAC PDU data packet includes at least one first-type MAC control element CE, and each first-type MAC CE is used to carry information about at least one secondary serving cell; and obtaining the first-type MAC CE, and determining, according to a location of the first-type MAC CE in the MAC PDU data packet, a secondary serving cell corresponding to the first-type MAC CE, to obtain information about the secondary serving cell.

Optionally, the processor 610 invokes the program code in the memory 620, to specifically perform the following operations:

determining, according to any one of the following, a secondary serving cell corresponding to each first-type MAC CE:

a location of each first-type MAC CE in first-type MAC CEs in the MAC PDU data packet, a location of each first-type MAC CE in MAC CEs in the MAC PDU data packet, or a location of each first-type MAC CE in MAC SDUs, MAC CEs, and padding units in the MAC PDU data packet.

Optionally, the processor 610 invokes the program code in the memory 620, to specifically perform the following operations:

if a first MAC CE in the at least one first-type MAC CE is the $X^{th}$ first-type MAC CE in the MAC PDU data packet, determining that the first MAC CE corresponds to secondary serving cells whose cell indexes are $(X-1)*N+1$ to $(X-1)*N+N$; or if a location of a first MAC CE in the at least one first-type MAC CE is the $X^{th}$ MAC CE in the MAC PDU data packet, determining that the first MAC CE corresponds to secondary serving cells whose cell indexes are $(X-1)*N+1$ to $(X-1)*N+N$; or if a location of a first MAC CE in the at least one first-type MAC CE is the $X^{th}$ unit in the MAC SDUs, the MAC CEs, and the padding units in the MAC PDU data packet, determining that the first MAC CE corresponds to secondary serving cells whose cell indexes are $(X-1)*N+1$ to $(X-1)*N+N$.

Optionally, secondary serving cells of user equipment are grouped by using Radio Resource Control RRC signaling, each first-type MAC CE is used to carry information about a secondary serving cell in a cell group, and the processor 610 invokes the program code in the memory 620, to specifically perform the following operations:

if a location of a first MAC CE in the at least one first-type MAC CE is the $X^{th}$ first-type MAC CE in the MAC PDU data packet, determining that the first MAC CE carries information about a secondary serving cell whose corresponding group number is X; or if a location of a first MAC CE in the at least one first-type MAC CE is the $X^{th}$ MAC CE in the MAC PDU data packet, determining that the first MAC CE carries information about a secondary serving cell whose corresponding group number is X; or if a location of a first MAC CE in the at least one first-type MAC CE is the $X^{th}$ unit in the MAC SDUs, the MAC CEs, and the padding units in the MAC PDU data packet, determining that the first MAC CE carries information about a secondary serving cell whose corresponding group number is X.

Optionally, the MAC PDU data packet further includes at least one LCID, the at least one LCID is in a one-to-one correspondence with the at least one first-type MAC CE, and each of the at least one LCID is used to indicate that a respective corresponding MAC CE is a first-type MAC CE.

Optionally, each first-type MAC CE includes Ci, a value of i ranges from 1 to 7, and if the first MAC CE in the at least one first-type MAC CE carries information about secondary serving cells whose corresponding cell indexes are $(X-1)*7+1$ to $(X-1)*7+7$, Ci in the first MAC CE corresponds to a secondary serving cell whose cell index is $(X-1)*7+i$.

Optionally, the first-type MAC CE is an activation/deactivation MAC CE, the first communications device is a base station, and the communications device 600 is user equipment.

Optionally, the first-type MAC CE is an extended PHR MAC CE or a dual connectivity PHR MAC CE, the first communications device is user equipment, and the communications device 600 is a base station.

Optionally, when the first-type MAC CE is an extended PHR MAC CE, the first MAC CE in the at least one first-type MAC CE further includes power headroom information of a primary serving cell, a first-type MAC CE after the first one of the at least one first-type MAC CE does not include the power headroom information of the primary serving cell, and the processor 610 invokes the program code in the memory 620, to further perform the following operation: obtaining the power headroom information of the primary serving cell from the first MAC CE; or when the first-type MAC CE is a dual connectivity PHR MAC CE, the first MAC CE in the at least one first-type MAC CE further includes power headroom information of a primary serving cell and power headroom information of a primary secondary serving cell, a first-type MAC CE after the first one of the at least one first-type MAC CE includes neither the power headroom information of the primary serving cell nor the power headroom information of the primary secondary serving cell, and the processor 610 invokes the program code in the memory 620 to further perform the following operation:

obtaining the power headroom information of the primary serving cell and the power headroom information of the primary secondary serving cell from the first MAC CE.

When power headroom information of a secondary serving cell indicated by the first-type MAC CE is carried, and the secondary serving cell has a PUCCH, the first-type MAC CE further includes type-2 information of the secondary serving cell; and the processor 610 invokes the program code in the memory 620 to further perform the following operation:

obtaining the type-2 information of the secondary serving cell according to the first-type MAC CE.

It should be understood that, the communications device 600 in this embodiment of the present invention may correspond to the second communications device in the foregoing communication methods 100 and 200, and can implement a function of the second communications device. For brevity, details are not described herein again.

Therefore, in this embodiment of the present invention, when generating a MAC PDU data packet, the communications device 600 determines a location of a first-type MAC CE in the MAC PDU data packet according to a secondary serving cell corresponding to the first-type MAC CE, so that when parsing the MAC PDU data packet, a communications device 600 can determine, according to a location of each first-type MAC CE in the MAC PDU data packet, a secondary serving cell corresponding to each first-type MAC CE, to obtain information about the secondary serving cell. Therefore, when a quantity of cells that need to be aggregated increases, multiple first-type MAC CEs may be added to one MAC PDU data packet, the first-type MAC CEs respectively carry information about different secondary serving cells, and it is determined, based on a location of a MAC CE in MAC PDU data, secondary serving cells about which information is carried in the MAC CE. In this way, a format of the MAC CE does not need to be changed (for example, a change that is brought when a group number of the MAC CE is increased or a length of the MAC CE is increased) to support aggregation of more cells, so that a relatively slight change is made to a protocol, and implementation is easy.

Figure 14:
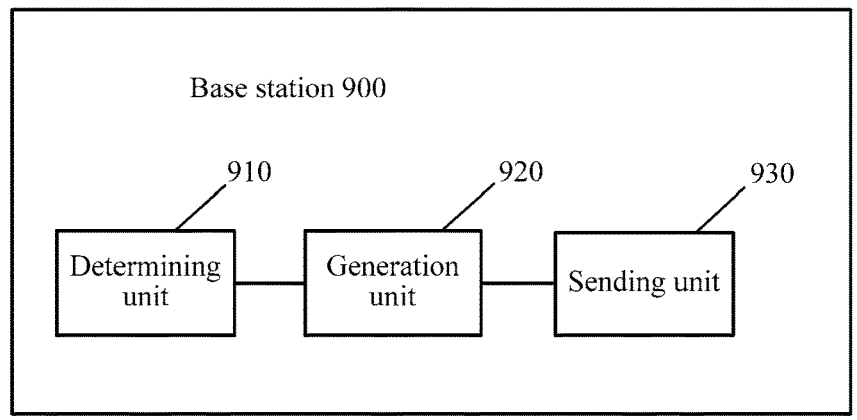
FIG. 14 is a schematic block diagram of a base station according to another embodiment of the present invention.

FIG. 14 is a schematic block diagram of a base station 900 according to an embodiment of the present invention. As shown in FIG. 14, the base station 900 includes:

a determining unit 910, configured to determine that a first secondary serving cell needs to be activated, where all secondary serving cells in a first secondary serving cell group to which the first secondary serving cell belongs are in a deactivated state;

a generation unit 920, configured to generate a first MAC PDU data packet, where the first MAC PDU data packet includes a first activation/deactivation MAC CE, the first activation/deactivation MAC CE includes indication information, and the indication information is used to instruct to activate the first secondary serving cell or used to instruct to activate the first secondary serving cell group; and a sending unit 930, configured to send the first MAC PDU to user equipment by using a primary serving cell, so that the user equipment activates the first secondary serving cell or the first secondary serving cell group.

Optionally, the first activation/deactivation MAC CE is used to indicate activated/deactivated states of N secondary serving cells, where different secondary serving cells in the N secondary serving cells respectively belong to different secondary serving cell groups in N secondary serving cell groups.

That is, the first MAC CE includes indication information, that is, Ci (where a value of i ranges from 1 to N), used to indicate the activated/deactivated states of the N secondary serving cells, and different secondary serving cells in the N secondary serving cells belong to different secondary serving cell groups.

Optionally, when the first activation/deactivation MAC CE is used to indicate the activated/deactivated states of the N secondary serving cells, the determining unit 910 is further configured to determine, according to a fact that a second secondary serving cell needs to be activated, that the first secondary serving cell needs to be activated, where the second secondary serving cell belongs to the first secondary serving cell group; and after the user equipment activates the first secondary serving cell, the generation unit 920 is further configured to generate a second MAC PDU data packet, where the first MAC PDU data packet includes a second activation/deactivation MAC CE, the second activation/deactivation MAC CE corresponds to the first secondary serving cell group and is used to indicate an activated/deactivated state in the first secondary serving cell group, and the second secondary serving cell is in an activated state in the second activation/deactivation MAC CE.

The sending unit 930 is further configured to send the second MAC PDU to the user equipment by using the first secondary serving cell, so that the second user equipment activates the second secondary serving cell.

Specifically, at least one secondary serving cell in each group may be allocated one index that is included in a group to which the primary serving cell belongs. In this way, when all cells in a group are deactivated, a cell, in the group, having a cell index in the group to which the primary serving cell belongs may be activated by using the primary serving cell, and another cell in the group may further be activated by using the cell. Certainly, because the cell is also allocated an index in the group, activation/deactivation may also be performed by using a cell in the group. It should be understood that, the mentioned group to which the primary serving cell belongs may be such a cell group that the group includes the primary serving cell and at least one secondary serving cell in each secondary serving cell group.

Optionally, the first activation/deactivation MAC CE is used to indicate activated/deactivated states of N secondary serving cell groups.

That is, the first MAC CE includes $C_i$ (where a value of i ranges from 1 to N), used to indicate the activated/deactivated states of the N secondary serving cell groups. For example, $C_1$ indicates that the first secondary serving cell group is in an activated state, so that all secondary serving cells in the first secondary serving cell group can be activated. For another example, $C_2$ indicates that the second secondary serving cell group is in a deactivated state, so that all secondary serving cells in the second secondary serving cell group can be deactivated.

Specifically, each cell group is allocated one group number, and each cell group corresponds to one bit in a MAC CE. For a cell group, activation/deactivation is performed by using a MAC CE delivered by the primary serving cell. For a cell in a cell group corresponding to a secondary serving cell, activation/deactivation is performed by using a MAC CE delivered by the secondary serving cell.

Optionally, the base station may group secondary serving cells of the user equipment (where the grouping is performed by using Radio Resource Control RRC signaling). Each first-type MAC CE is used to carry information about a secondary serving cell in a secondary serving cell group. Bits in each MAC CE may be mapped to secondary serving cells in the following two manners.

1). Each secondary serving cell is allocated one intra-secondary serving cell group index, and $C_i$ corresponds to a secondary serving cell whose intra-secondary serving cell group index is i.

2). Values of cell indexes of secondary serving cells respectively and sequentially correspond to $C_i$. For example, a secondary serving cell whose cell index is the smallest in cells in the secondary serving cell group corresponds to $C_1$, a secondary serving cell whose cell index is immediately greater than the smallest cell index in the cells in the secondary serving cell group corresponds to $C_2$, and so on.

Therefore, the foregoing method can resolve the following problem: A first-type MAC CE does not carry secondary serving cell group number information, a transmitter sends, in a cell in a secondary serving cell group corresponding to the MAC CE, the first-type MAC CE, and a receiver learns, according to a secondary serving cell that receives the MAC CE, that the first-type MAC CE corresponds to a secondary serving cell group to which the secondary serving cell belongs. However, when all cells in a cell group are deactivated, activation cannot be performed by sending, by using a secondary serving cell in the secondary serving cell group, the MAC CE.

Therefore, the foregoing embodiment can increase a quantity of to-be-aggregated cells or flexibly change a quantity of to-be-aggregated cells while making no change to a signaling structure, that is, maintaining a structure of a MAC CE and a structure of a sub-header.

Figure 15:
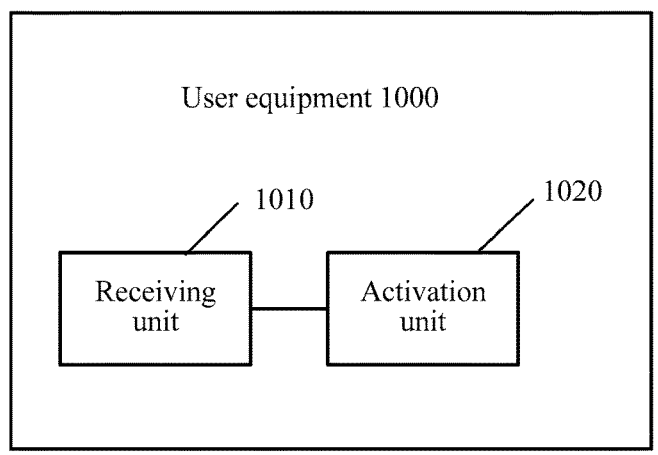
FIG. 15 is a schematic block diagram of a base station according to another embodiment of the present invention.

FIG. 15 is a schematic block diagram of user equipment 1000 according to an embodiment of the present invention. As shown in FIG. 15, the user equipment 1000 includes:

a receiving unit 1010, configured to receive a first MAC PDU data packet by using a primary serving cell, where the first MAC PDU data packet includes a first activation/deactivation MAC CE, the first activation/deactivation MAC CE includes indication information, and the indication information is used to instruct to activate a first secondary serving cell or used to instruct to activate a first secondary serving cell group; and an activation unit 1020, configured to activate the first secondary serving cell or the first secondary serving cell group according to the first MAC CE.

Optionally, the first activation/deactivation MAC CE is used to indicate activated/deactivated states of N secondary serving cells, where different secondary serving cells in the N secondary serving cells respectively belong to different secondary serving cell groups in N secondary serving cell groups.

That is, the first MAC CE includes an indication, that is, $C_i$ (where a value of i ranges from 1 to N), used to indicate the activated/deactivated states of the N secondary serving cells. Each secondary serving cell respectively belongs to one secondary serving cell group, and different secondary serving cells in the N secondary serving cells belong to different secondary serving cell groups.

Optionally, when the first activation/deactivation MAC CE is used to indicate the activated/deactivated states of the N secondary serving cells, after the first secondary serving cell is activated, the receiving unit 1010 is further configured to receive a second MAC PDU data packet by using the first secondary serving cell, where the second MAC PDU data packet includes a second activation/deactivation MAC CE, the second activation/deactivation MAC CE corresponds to the first secondary serving cell group and is used to indicate an activated/deactivated state in the first secondary serving cell group, the second secondary serving cell and the first secondary serving cell belong to the first secondary serving cell group, and the second secondary serving cell is in an activated state in the second activation/deactivation MAC CE.

The activation unit 1020 is further configured to activate the second cell according to the second MAC PDU data packet.

Specifically, at least one secondary serving cell in each group may be allocated one index that is included in a group to which the primary serving cell belongs. In this way, when all cells in a group are deactivated, a cell, in the group, having a cell index in the group to which the primary serving cell belongs may be activated by using the primary serving cell, and another cell in the group may further be activated by using the cell. Certainly, because the cell is also allocated an index in the group, activation/deactivation may also be performed by using a cell in the group.

Optionally, the first activation/deactivation MAC CE is used to indicate activated/deactivated states of N secondary serving cell groups.

That is, the first MAC CE includes $C_i$ (where a value of i ranges from 1 to N), used to indicate the activated/deactivated states of the N secondary serving cell groups. For example, $C_1$ indicates that the first secondary serving cell group is in an activated state, so that all secondary serving cells in the first secondary serving cell group can be activated. For another example, C2 indicates that the second secondary serving cell group is in a deactivated state, so that all secondary serving cells in the second secondary serving cell group can be deactivated.

Specifically, each cell group is allocated one group number, and each cell group corresponds to one bit in a MAC CE. For a cell group, activation/deactivation is performed by using a MAC CE delivered by the primary serving cell. For a cell in a cell group corresponding to a secondary serving cell, activation/deactivation is performed by using a MAC CE delivered by the secondary serving cell.

Optionally, the base station may group secondary serving cells of the user equipment (where the grouping is performed by using Radio Resource Control RRC signaling). Each first-type MAC CE is used to carry information about a secondary serving cell in a secondary serving cell group. Bits in each MAC CE may be mapped to secondary serving cells in the following two manners.

1). Each secondary serving cell is allocated one intra-secondary serving cell group index, and Ci corresponds to a secondary serving cell whose intra-secondary serving cell group index is i.

2). Values of cell indexes of secondary serving cells respectively and sequentially correspond to Ci. For example, a secondary serving cell whose cell index is the smallest in cells in the secondary serving cell group corresponds to C1, a secondary serving cell whose cell index is immediately greater than the smallest cell index in the secondary cells in the secondary serving cell group corresponds to C2, and so on.

Therefore, the foregoing method can resolve the following problem: A first-type MAC CE does not carry secondary serving cell group number information, a transmitter sends, in a cell in a cell group corresponding to the MAC CE, the first-type MAC CE, and a receiver learns, according to a cell that receives the MAC CE, that the first-type MAC CE corresponds to a cell group to which the cell belongs. However, when all cells in a cell group are deactivated, activation cannot be performed by sending, by using a cell in the cell group, the MAC CE.

Therefore, the foregoing embodiment can increase a quantity of to-be-aggregated cells or flexibly change a quantity of to-be-aggregated cells while making no change to a signaling structure, that is, maintaining a structure of a MAC CE and a structure of a sub-header.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one location, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
   determining, by a first communications device, that a Media Access Control (MAC) protocol data unit (PDU) data packet needs to be generated;
   in response to determining that the MAC PDU data packet needs to be generated:
      determining one or more secondary serving cells about which information needs to be carried in at least one MAC control element (CE) of the MAC PDU data packet; and
      generating, by the first communications device, the MAC PDU data packet including at least one first-type MAC CE, wherein:
         each first-type MAC CE is used to carry information about at least one secondary serving cell of the one or more secondary serving cells,
         the first communications device determines a location of the first-type MAC CE in the MAC PDU data packet according to a secondary serving cell corresponding to the each first-type MAC CE, and for a plurality of secondary serving cells to be aggregated, the generating the MAC PDU data packet including the at least one first-type MAC CE comprises:
generating a plurality of first-type MAC CEs for the plurality of secondary serving cells; and
adding each of the plurality of first-type MAC CEs to one MAC PDU data packet in the absence of changing a format of the each of the plurality of first-type MAC CEs; and
sending, by the first communications device, the MAC PDU data packet to a second communications device, to enable the second communications device to obtain the at least one first-type MAC CE, and to determine, according to one or more locations of the at least one first-type MAC CE in the MAC PDU data packet, the one or more secondary serving cells corresponding to the at least one first-type MAC CE, to obtain the information about the one or more secondary serving cells, wherein the information about the one or more secondary serving cells is obtained by the second communications device from the at least one first-type MAC CE.

2. The method according to claim 1, wherein the determining, by the first communications device, a location of the first-type MAC CE in the MAC PDU data packet according to a secondary serving cell corresponding to the first-type MAC CE comprises determining, by the first communications device:
a location of each first-type MAC CE in a plurality of first-type MAC CEs in the MAC PDU data packet according to the secondary serving cell corresponding to the first-type MAC CE; or
a location of each first-type MAC CE in MAC CEs in the MAC PDU data packet; or
a location of each first-type MAC CE in MAC service data units SDUs, MAC CEs, and padding units in the MAC PDU data packet.

3. The method according to claim 2, wherein each first-type MAC CE is used to carry information about N secondary serving cells, and the determining, by the first communications device, a location of the first-type MAC CE in the MAC PDU data packet according to a secondary serving cell corresponding to the first-type MAC CE comprises:
when a first MAC CE in the at least one first-type MAC CE carries information about secondary serving cells whose corresponding cell indexes are $(X-1)*N+1$ to $(X-1)*N+N$, determining that the first MAC CE is the $X^{th}$ first-type MAC CE in the MAC PDU data packet; or
when a first MAC CE in the at least one first-type MAC CE carries information about secondary serving cells whose corresponding cell indexes are $(X-1)*N+1$ to $(X-1)*N+N$, determining that the first MAC CE is the $X^{th}$ MAC CE in the MAC PDU data packet; or
when a first MAC CE in the at least one first-type MAC CE carries information about secondary serving cells whose corresponding cell indexes are $(X-1)*N+1$ to $(X-1)*N+N$, determining that the first MAC CE is the $X^{th}$ unit in the MAC SDUs, the MAC CEs, and the padding units in the MAC PDU data packet.

4. The method according to claim 2, wherein secondary serving cells of user equipment are grouped using Radio Resource Control (RRC) signaling, each first-type MAC CE is used to carry information about a secondary serving cell in a cell group, and the determining, by the first communications device, a location of the first-type MAC CE in the MAC PDU data packet according to a secondary serving cell corresponding to the first-type MAC CE comprises:
when a first MAC CE in the at least one first-type MAC CE carries information about a secondary serving cell whose corresponding group number is X, determining that the first MAC CE is the $X^{th}$ first-type MAC CE in the MAC PDU data packet; or
when a first MAC CE in the at least one first-type MAC CE carries information about a secondary serving cell whose corresponding group number is X, determining that the first MAC CE is the $X^{th}$ MAC CE in the MAC PDU data packet; or
when a first MAC CE in the at least one first-type MAC CE carries information about a secondary serving cell whose corresponding group number is X, determining that the first MAC CE is the $X^{th}$ unit in the MAC service data units SDUs, the MAC CEs, and the padding units in the MAC PDU data packet.

5. The method according to claim 1, wherein each first-type MAC CE comprises Ci, a value of i ranges from 1 to 7, and if the first MAC CE in the at least one first-type MAC CE carries information about secondary serving cells whose corresponding cell indexes are $(X-1)*7+1$ to $(X-1)*7+7$, Ci in the first MAC CE corresponds to a secondary serving cell whose cell index is $(X-1)*7+i$.

6. The method according to claim 5, wherein the generating, by a first communications device, a MAC PDU data packet comprises:
determining, by the first communications device, that a MAC CE corresponding to a secondary serving cell whose cell index is the largest in secondary serving cells whose activated/deactivated states need to be changed is a MAC CE at a rearmost location in the at least one first-type MAC CE; or
determining, by the first communications device, that a MAC CE corresponding to a secondary serving cell whose group number is the largest in secondary serving cells whose activated/deactivated states need to be changed is a MAC CE at a rearmost location in the at least one first-type MAC CE.

7. A communication method, comprising:
obtaining, by the second communications device, the Media Access Control (MAC) protocol data unit (PDU) data packet generated and sent by the first communications device according to the method of claim 1, wherein the MAC PDU data packet includes the at least one first-type MAC control element (CE), and the each first-type MAC CE is used to carry the information about the one or more secondary serving cells; and
obtaining, by the second communications device, the at least one first-type MAC CE from the MAC PDU data packet, and determining, according to the one or more locations of the at least one first-type MAC CE in the MAC PDU data packet, the one or more secondary serving cells corresponding to the at least one first-type MAC CE, to obtain the information about the one or more secondary serving cells, wherein the information about the one or more secondary serving cells is obtained from the at least one first-type MAC CE.

8. The method according to claim 7, wherein the determining, according to a location of the first-type MAC CE in the MAC PDU data packet, a secondary serving cell corresponding to the first-type MAC CE, to obtain information about the secondary serving cell comprises determining, by the second communications device:

a location of each first-type MAC CE in first-type MAC CEs in the MAC PDU data packet; or a location of each first-type MAC CE in MAC CEs in the MAC PDU data packet; or a location of each first-type MAC CE in MAC SDUs, MAC CEs, and padding units in the MAC PDU data packet.

9. The method according to claim 8, wherein the determining, according to a location of the first-type MAC CE in the MAC PDU data packet, a secondary serving cell corresponding to the first-type MAC CE, to obtain information about the secondary serving cell comprises:

when a first MAC CE in the at least one first-type MAC CE is the $X^{th}$ first-type MAC CE in the MAC PDU data packet, determining that the first MAC CE corresponds to secondary serving cells whose cell indexes are $(X-1)*N+1$ to $(X-1)*N+N$; or when a location of a first MAC CE in the at least one first-type MAC CE is the $X^{th}$ MAC CE in the MAC PDU data packet, determining that the first MAC CE corresponds to secondary serving cells whose cell indexes are $(X-1)*N+1$ to $(X-1)*N+N$; or when a location of a first MAC CE in the at least one first-type MAC CE is the $X^{th}$ unit in the MAC SDUs, the MAC CEs, and the padding units in the MAC PDU data packet, determining that the first MAC CE corresponds to secondary serving cells whose cell indexes are $(X-1)*N+1$ to $(X-1)*N+N$.

10. The method according to claim 8, wherein secondary serving cells of user equipment are grouped using Radio Resource Control (RRC) signaling, each first-type MAC CE is used to carry information about a secondary serving cell in a cell group, and the determining, according to a location of the first-type MAC CE in the MAC PDU data packet, a secondary serving cell corresponding to the first-type MAC CE, to obtain information about the secondary serving cell comprises:

when a location of a first MAC CE in the at least one first-type MAC CE is the $X^{th}$ first-type MAC CE in the MAC PDU data packet, determining that the first MAC CE carries information about a secondary serving cell whose corresponding group number is X; or when a location of a first MAC CE in the at least one first-type MAC CE is the $X^{th}$ MAC CE in the MAC PDU data packet, determining that the first MAC CE carries information about a secondary serving cell whose corresponding group number is X; or when a location of a first MAC CE in the at least one first-type MAC CE is the $X^{th}$ unit in the MAC SDUs, the MAC CEs, and the padding units in the MAC PDU data packet, determining that the first MAC CE carries information about a secondary serving cell whose corresponding group number is X.

11. The method according to claim 7, wherein each first-type MAC CE comprises Ci, a value of i ranges from 1 to 7, and if the first MAC CE in the at least one first-type MAC CE carries information about secondary serving cells whose corresponding cell indexes are $(X-1)*7+1$ to $(X-1)*7+7$, Ci in the first MAC CE corresponds to a secondary serving cell whose cell index is $(X-1)*7+i$.

12. A communications device, comprising:
a processor; and
a non-transitory computer readable storage medium storing a program for execution by the processor, the program including instructions to:
receive the Media Access Control (MAC) protocol data unit (PDU) data packet generated and sent by the first communications device according to the method of claim 1, wherein the MAC PDU data packet includes the at least one first-type MAC control element (CE), and the each first-type MAC CE is used to carry the information about the one or more secondary serving cells; and obtain the at least one first-type MAC CE from the MAC PDU data packet, and determine, according to the one or more locations of the at least one first-type MAC CE in the MAC PDU data packet, the one or more secondary serving cells corresponding to the at least one first-type MAC CE, to obtain the information about the one or more secondary serving cells, wherein the information about the one or more secondary serving cells is obtained from the at least one first-type MAC CE.

13. The communications device according to claim 12, wherein the program further includes instructions to determine:

a location of each first-type MAC CE in a plurality of first-type MAC CEs in the MAC PDU data packet; or a location of each first-type MAC CE in MAC CEs in the MAC PDU data packet; or a location of each first-type MAC CE in MAC SDUs, MAC CEs, and padding units in the MAC PDU data packet.

14. The communications device according to claim 13, wherein the program further includes instructions to:

when a first MAC CE in the at least one first-type MAC CE is the $X^{th}$ first-type MAC CE in the MAC PDU data packet, determine that the first MAC CE corresponds to secondary serving cells whose cell indexes are $(X-1)*N+1$ to $(X-1)*N+N$; or when a location of a first MAC CE in the at least one first-type MAC CE is the $X^{th}$ MAC CE in the MAC PDU data packet, determine that the first MAC CE corresponds to secondary serving cells whose cell indexes are $(X-1)*N+1$ to $(X-1)*N+N$; or when a location of a first MAC CE in the at least one first-type MAC CE is the $X^{th}$ unit in the MAC SDUs, the MAC CEs, and the padding units in the MAC PDU data packet, determine that the first MAC CE corresponds to secondary serving cells whose cell indexes are $(X-1)*N+1$ to $(X-1)*N+N$.

15. The communications device according to claim 13, wherein secondary serving cells of user equipment are grouped using Radio Resource Control (RRC) signaling, each first-type MAC CE is used to carry information about a secondary serving cell in a cell group, and the program further includes instructions to:

when a location of a first MAC CE in the at least one first-type MAC CE is the $X^{th}$ first-type MAC CE in the MAC PDU data packet, determine that the first MAC CE carries information about a secondary serving cell whose corresponding group number is X; or when a location of a first MAC CE in the at least one first-type MAC CE is the $X^{th}$ MAC CE in the MAC PDU data packet, determine that the first MAC CE carries information about a secondary serving cell whose corresponding group number is X; or when a location of a first MAC CE in the at least one first-type MAC CE is the $X^{th}$ unit in the MAC SDUs, the MAC CEs, and the padding units in the MAC PDU data packet, determine that the first MAC CE carries information about a secondary serving cell whose corresponding group number is X.

16. The communications device according to claim 12, wherein each first-type MAC CE comprises $C_i$, a value of i ranges from 1 to 7, and if the first MAC CE in the at least one first-type MAC CE carries information about secondary serving cells whose corresponding cell indexes are $(X-1)*7+1$ to $(X-1)*7+7$, $C_i$ in the first MAC CE corresponds to a secondary serving cell whose cell index is $(X-1)*7+i$.

17. A communications device, comprising:
a processor, configured to:
    determine that a Media Access Control (MAC) protocol data unit (PDU) data packet needs to be generated;
    in response to determining that the MAC PDU data packet needs to be generated:
        determine one or more secondary serving cells about which information needs to be carried in at least one MAC control element (CE) of the MAC PDU data packet; and
        generate the MAC PDU data packet including at least one first-type MAC control element (CE), wherein:
            each first-type MAC CE is used to carry information about at least one secondary serving cell of the one or more secondary serving cells,
            the processor is further configured to determine a location of the first-type MAC CE in the MAC PDU data packet according to a secondary serving cell corresponding to the first-type MAC CE; and
            for a plurality of secondary serving cells to be aggregated, the processor is further configured to:
                generate a plurality of first-type MAC CEs for the plurality of secondary serving cells; and
                add each of the plurality of first-type MAC CEs to one MAC PDU data packet in the absence of changing a format of the each of the plurality of first-type MAC CEs; and
a transmitter, configured to send the MAC PDU data packet generated by the processor to a second communications device, to enable the second communications device to obtain the at least one first-type MAC CE, and to determine, according to one or more locations of the at least one first-type MAC CE in the MAC PDU data packet, the one or more secondary serving cells corresponding to the at least one first-type MAC CE, to obtain the information about the one or more secondary serving cells, wherein the information about the one or more secondary serving cells is obtained by the second communication device from the at least one first-type MAC CE.

18. The communications device according to claim 17, wherein the processor is further configured to determine:
a location of each first-type MAC CE in a plurality of first-type MAC CEs in the MAC PDU data packet according to the secondary serving cell corresponding to the first-type MAC CE; or
a location of each first-type MAC CE in MAC CEs in the MAC PDU data packet; or
a location of each first-type MAC CE in MAC SDUs, MAC CEs, and padding units in the MAC PDU data packet.

19. The communications device according to claim 18, wherein each first-type MAC CE is used to carry information about N secondary serving cells, and the processor is further configured to:
    when a first MAC CE in the at least one first-type MAC CE carries information about secondary serving cells whose corresponding cell indexes are $(X-1)*N+1$ to $(X-1)*N+N$, determine that the first MAC CE is the $X^{th}$ first-type MAC CE in the MAC PDU data packet; or
    when a first MAC CE in the at least one first-type MAC CE carries information about secondary serving cells whose corresponding cell indexes are $(X-1)*N+1$ to $(X-1)*N+N$, determine that the first MAC CE is the $X^{th}$ MAC CE in the MAC PDU data packet; or
    when a first MAC CE in the at least one first-type MAC CE carries information about secondary serving cells whose corresponding cell indexes are $(X-1)*N+1$ to $(X-1)*N+N$, determine that the first MAC CE is the $X^{th}$ unit in the MAC SDUs, the MAC CEs, and the padding units in the MAC PDU data packet.

20. The communications device according to claim 18, wherein secondary serving cells of user equipment are grouped using Radio Resource Control (RRC) signaling, each first-type MAC CE is used to carry information about a secondary serving cell in a cell group, and the processor is further configured to:
    when a first MAC CE in the at least one first-type MAC CE carries information about a secondary serving cell whose corresponding group number is X, determine that the first MAC CE is the $X^{th}$ first-type MAC CE in the MAC PDU data packet; or
    when a first MAC CE in the at least one first-type MAC CE carries information about a secondary serving cell whose corresponding group number is X, determine that the first MAC CE is the $X^{th}$ MAC CE in the MAC PDU data packet; or
    when a first MAC CE in the at least one first-type MAC CE carries information about a secondary serving cell whose corresponding group number is X, determine that the first MAC CE is the $X^{th}$ unit in the MAC service data units SDUs, the MAC CEs, and the padding units in the MAC PDU data packet.

21. The communications device according to claim 17, wherein each first-type MAC CE comprises $C_i$, a value of i ranges from 1 to 7, and if the first MAC CE in the at least one first-type MAC CE carries information about secondary serving cells whose corresponding cell indexes are $(X-1)*7+1$ to $(X-1)*7+7$, $C_i$ in the first MAC CE corresponds to a secondary serving cell whose cell index is $(X-1)*7+i$.

22. The communications device according to claim 21, wherein the processor is further configured to:
    determine that a MAC CE corresponding to a secondary serving cell whose cell index is the largest in secondary serving cells whose power headroom information needs to be reported is a MAC CE at a rearmost location in the at least one first-type MAC CE; or
    determine that a MAC CE corresponding to a secondary serving cell whose group number is the largest in secondary serving cells whose power headroom information needs to be reported is a MAC CE at a rearmost location in the at least one first-type MAC CE.

* * * * *